(12) United States Patent
Matsuoka et al.

(10) Patent No.: US 11,861,060 B2
(45) Date of Patent: Jan. 2, 2024

(54) RECORDING MEDIUM FOR SELECTING OBJECTS USING HEAD MOUNTED DISPLAY, INFORMATION PROCESSING SYSTEM, AND INFORMATION PROCESSING METHOD

(71) Applicant: Konami Digital Entertainment Co., Ltd., Tokyo (JP)

(72) Inventors: Isao Matsuoka, Tokyo (JP); Junichi Taniguchi, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 326 days.

(21) Appl. No.: 17/012,324

(22) Filed: Sep. 4, 2020

(65) Prior Publication Data

US 2020/0401217 A1    Dec. 24, 2020

Related U.S. Application Data

(63) Continuation of application No. PCT/JP2019/010638, filed on Mar. 14, 2019.

(30) Foreign Application Priority Data

Mar. 23, 2018 (JP) .................................. 2018-055561

(51) Int. Cl.
*G06F 3/0482* (2013.01)
*G06F 3/01* (2006.01)

(52) U.S. Cl.
CPC ............ *G06F 3/012* (2013.01); *G06F 3/0482* (2013.01)

(58) Field of Classification Search
CPC ........ G06F 3/012; G06F 3/0482; G06F 1/163; G06F 1/1694; G06F 3/011; G06F 3/013;
(Continued)

(56) References Cited

U.S. PATENT DOCUMENTS

2017/0038837 A1* 2/2017 Faaborg .................. G06F 3/017
2017/0076503 A1* 3/2017 Tamaoki ................. G06F 3/017
(Continued)

FOREIGN PATENT DOCUMENTS

JP         9-6473 A      1/1997
JP    2009-205557 A      9/2009
(Continued)

OTHER PUBLICATIONS

Decision of Refusal dated Dec. 1, 2020 from the Japanese Patent Office in Application No. 2019-202162.
(Continued)

*Primary Examiner* — Phuong H Nguyen
(74) *Attorney, Agent, or Firm* — Sughrue Mion, PLLC

(57) ABSTRACT

A non-transitory computer readable recording medium having recorded therein a program, the program causes a processor to: cause a display provided on a Head Mounted Display to display a stereoscopic image to which binocular parallax is applied, the stereoscopic image being an image of a virtual space in which optional objects are disposed, and the virtual space being captured by a virtual camera; acquire orientation information on an orientation of the Head Mounted Display; when a predetermined position relationship is established between a virtual line and one optional object from among the optional objects, the virtual line having a direction according to the orientation information and intersecting with the virtual camera, identify the one option image; and when one or more optional objects are
(Continued)

identified and a predetermined condition relating to the orientation information is satisfied, select the one or more optional objects.

17 Claims, 14 Drawing Sheets

(58) Field of Classification Search
CPC ...... G06F 3/0304; G06F 3/0346; G06F 3/038; G06F 3/04815; G06F 3/04842; H04N 5/64; G02B 27/017; G02B 2027/0138; G02B 2027/018
See application file for complete search history.

(56) References Cited

U.S. PATENT DOCUMENTS

| | | | | |
|---|---|---|---|---|
| 2018/0341386 | A1* | 11/2018 | Inomata | A63F 13/211 |
| 2019/0244416 | A1* | 8/2019 | Tamaoki | G09G 5/38 |

FOREIGN PATENT DOCUMENTS

| | | |
|---|---|---|
| JP | 2016-115122 A | 6/2016 |
| JP | 2017-58971 A | 3/2017 |
| JP | 2017-182217 A | 10/2017 |
| JP | 2018-5516 A | 1/2018 |
| JP | 6277567 B1 | 2/2018 |
| JP | 2018-41176 A | 3/2018 |
| WO | 2017/110632 A1 | 6/2017 |

OTHER PUBLICATIONS

Decision of Dismissal of Amendment dated Dec. 1, 2020 from the Japanese Patent Office in Application No. 2019-202162.
Notice of Reasons for Refusal dated Nov. 9, 2021 from the Japanese Patent Office in Japanese Application No. 2019-202162.
Office Action dated Jun. 29, 2022 from the Korean Intellectual Property Office in KR Application No. 10-2020-7024775.
International Search Report dated Apr. 9, 2019 in International Application No. PCT/JP2019/010638.
Written Opinion of the International Searching Authority dated Apr. 9, 2019 in International Application No. PCT/JP2019/010638.
Office Action dated Feb. 12, 2019 in Japanese Application No. 2018-055561.
Office Action dated Jul. 2, 2019 in Japanese Application No. 2018-055561.
Office Action dated Mar. 10, 2020 in Japanese Application No. 2019-202162.
Office Action dated Sep. 15, 2020 in Japanese Application No. 2019-202162.
Office Action dated Feb. 25, 2023 in Chinese Application No. 201980017625.X.
Chinese Office Action dated Aug. 10, 2023 in Application No. 201980017625.X.

* cited by examiner

RECORDING MEDIUM FOR SELECTING OBJECTS USING HEAD MOUNTED DISPLAY, INFORMATION PROCESSING SYSTEM, AND INFORMATION PROCESSING METHOD

CROSS REFERENCE TO RELATED APPLICATIONS

This Application is a Continuation Application of PCT Application No. PCT/JP2019/010638, filed Mar. 14, 2019, which is based on and claims priority from Japanese Patent Application No. 2018-055561, filed Mar. 23, 2018, the entire contents of which are incorporated herein by reference.

BACKGROUND

Field of Invention

The present invention relates to recording mediums, information processing systems, and information processing methods.

Description of Related Art

Head Mounted Displays (HMDs) are being widely used recently. A HMD is set on a user's head, and displays, on a display thereof provided in the front of the user's eyes, for example, an image that is captured by a virtual camera and is a stereoscopic image to which binocular parallax is applied (see Japanese Patent Application Laid-Open Publication No. 2016-115122). In general, such a HMD changes an orientation of the virtual camera in a virtual space, based on change in orientation of the HMD, thereby enabling the user to view various directions in the virtual space.

However, a user wearing the HMD looks at the display provided in front of the user's eyes. This makes it difficult for the user to view a part other than the display. Accordingly, an input operation other than an input operation to change the orientation of the HMD, for example, an input operation with a controller, or with other similar device, that is held in the user's hand, may be a burden on the user wearing the HMD. Therefore, in a game or the like using the HMD, it is preferred that various instructions be accepted from the user according to a change in orientation of the HMD, for example.

However, in a case in which instructions from the user are accepted according to a change in orientation of the HMD, it is difficult for the user wearing the HMD to carry out an input operation other than an input operation to change in orientation of the virtual camera in the virtual space. For example, it may be difficult for the user to carry out an input operation to select an option or other similar operation, in a game using a HMD.

SUMMARY

The present invention has been made in view of the problem described above, and it has as an object to provide a technique that enables a user wearing a HMD to carry out an input operation to select an option with viewing a virtual space displayed on a display of the HMD.

To achieve the stated object, a non-transitory computer readable recording medium having recorded therein a program that is executed by a processor of an information processing apparatus, the program causes the processor to: cause a display provided on a Head Mounted Display to display a stereoscopic image to which binocular parallax is applied, the stereoscopic image being an image of a virtual space in which optional objects are disposed, and the virtual space being captured by a virtual camera; acquire orientation information on an orientation of the Head Mounted Display; when a predetermined position relationship is established between a virtual line and one optional object from among the optional objects, the virtual line having a direction according to the orientation information and intersecting with the virtual camera, identify the one option image; and when one or more optional objects are identified and a predetermined condition relating to the orientation information is satisfied, select the one or more optional objects.

An information processing system according to an aspect of the present invention includes: a Head Mounted Display including a display; and an information processing apparatus, in which the information apparatus includes: a processor; and a memory that is operatively coupled to the processor and is configured to store instructions executed by the processor, upon execution of the instructions the processor is configured to: cause a display provided on a Head Mounted Display to display a stereoscopic image to which binocular parallax is applied, the stereoscopic image being an image of a virtual space in which optional objects are disposed, and the virtual space being captured by a virtual camera; acquire orientation information on an orientation of the Head Mounted Display; when a predetermined position relationship is established between a virtual line and one optional object from among the optional objects, the virtual line having a direction according to the orientation information and intersecting with the virtual camera, identify the one option image; and when one or more optional objects are identified by the identifier and a predetermined condition relating to the orientation information is satisfied, select the one or more optional objects.

An information processing method according to an aspect of the present invention includes: causing a display provided on a Head Mounted Display to display a stereoscopic image to which binocular parallax is applied, the stereoscopic image being an image of a virtual space in which optional objects are disposed, and the virtual space being captured by a virtual camera; acquiring orientation information on an orientation of the Head Mounted Display; when a predetermined position relationship is established between a virtual line and one optional object from among the optional objects, the virtual line having a direction according to the orientation information and intersecting with the virtual camera, identifying the one option image; and when one or more optional objects are identified and a predetermined condition relating to the orientation information is satisfied, selecting the one or more optional objects.

MODES FOR CARRYING OUT THE INVENTION

Hereafter, modes for carrying out the present invention will be described with reference to the drawings. In each of the drawings, the dimensions and scale of each portion may appropriately differ from actual dimensions and scale. Furthermore, since the embodiments to be described below are preferred specific examples of the present invention, various types of technically preferable limits are given. However, the scope of the present invention is not limited to these modes unless otherwise specified in the following description.

A. Embodiment

An embodiment of the present invention will be described below.

1. Overview of Head Mounted Display

An overview of a Head Mounted Display 1 (hereafter a "HMD 1") according to the embodiment will be described below with reference to FIGS. 1 to 12.

1.1. Configuration of Head Mounted Display and Usage Thereof

First, the configuration of the HMD 1 and usage thereof will be described with reference to FIGS. 1 and 2.

Figure 1:
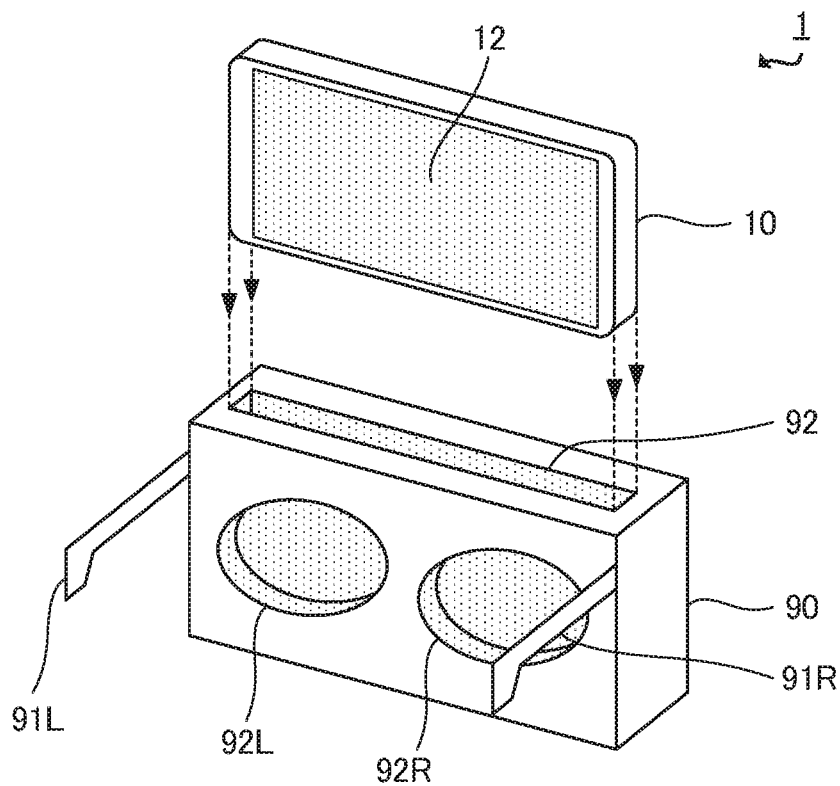
FIG. 1 is an explanatory diagram for an example configuration of a Head Mounted Display 1 according to an embodiment of the present invention.

FIG. 1 is an exploded perspective view for an example configuration of the HMD 1 according to the embodiment. FIG. 2 is an explanatory diagram for an example usage concept of the HMD 1 according to the embodiment.

As shown in FIG. 1, the HMD 1 includes a terminal apparatus 10 and wearable equipment 90. The terminal apparatus 10 (an example of "an information processing apparatus") includes a display 12. In the embodiment, an example case is assumed in which a smartphone is employed for the terminal apparatus 10. However, the terminal apparatus 10 may be dedicated to a display apparatus for the HMD 1.

Figure 2:
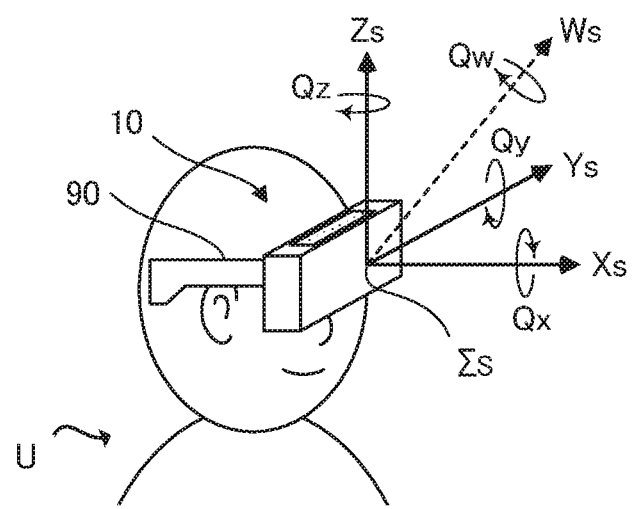
FIG. 2 is an explanatory diagram for an example usage of the Head Mounted Display 1.

As shown in FIG. 2, the wearable equipment 90 is a component for wearing the HMD 1 on a user U's head. As shown in FIG. 1, the wearable equipment 90 includes: a pair of temples 91L and 91R for wearing the HMD1 on the user U's head; a mounting space 92 for mounting the terminal apparatus 10 on the HMD1; and a pair of openings 92L and 92R. The openings 92L and 92R are provided at positions that correspond to those of the user U's eyes when the user U wears the HMD 1 on the head. There may be provided lenses at portions of the openings 92L and 92R. When the user U wears the HMD 1 on the head, the user U is able to view with the left eye the display 12 through the opening 92L or a lens provided in the opening 92L, the display 12 being included in the terminal apparatus 10 and the terminal apparatus 10 being inserted in the mounting space 92. The user U is able to view with the right eye the display 12 through the opening 92R or a lens provided in the opening 92R, the display 12 being included in the terminal apparatus 10 and the terminal apparatus 10 being inserted in the mounting space 92.

As shown in FIG. 2, the user U wearing the HMD 1 on the head is able to change orientation of the HMD 1 by changing orientation of the head of the user U. For the sake of clarity, a coordinate system fixed to the HMD 1, which is referred to as an "apparatus coordinate system $\Sigma_S$," will be used. The "apparatus coordinate system $\Sigma_S$" refers to a three-axis orthogonal coordinate system that has an $X_S$-axis, a $Y_S$-axis and a $Z_S$-axis orthogonal to one another and has the origin at a predetermined position of the HMD 1, for example. In the embodiment, as shown in FIG. 2, an example case is assumed in which when the user U wears the HMD 1, the apparatus coordinate system $\Sigma_S$ is set as follows. When viewed by the user U, a $+X_S$ direction represents a direction that is in front of the user U. When viewed by the user U, a $+Y_S$ direction represents a direction that is on the left. When viewed by the user U, a $+Z_S$ direction represents an upward direction.

As shown in FIG. 2, the user U wearing the HMD 1 on the head is able to change the orientation of the HMD1 by changing the orientation of the head such that the HMD 1 rotates in the rotational direction around the $X_S$-axis, that is, a roll direction $Q_X$. Likewise, the user U is able to change the orientation of the HMD1 by changing the orientation of the head such that the HMD 1 rotates in the rotational direction around the $Y_S$-axis, that is, a pitch direction $Q_Y$. The user U is able to change the orientation of the HMD1 by changing the orientation of the head such that the HMD 1 rotates in the rotational direction around the $Z_S$-axis, that is, a yaw direction $Q_Z$. In other words, the user U wearing the HMD 1 on the head is able to change the orientation of the HMD 1 by changing the orientation of the head such that the HMD 1 rotates in a desired rotational direction that is obtained by combining some or all of the roll direction $Q_X$, the pitch direction $Q_Y$ and the yaw direction $Q_Z$, that is, the rotational direction $Q_W$ around a desired rotational axis $W_S$. In the following description, an apparatus coordinate system $\Sigma_S$ fixed to the HMD 1 at a reference time t0 will be referred to as a "reference apparatus coordinate system $\Sigma_{S0}$." In the embodiment, the orientation of the HMD 1 at time t after the reference time t0 will be described as an orientation that is obtained by rotating the HMD 1 at the reference time t0 by an angle $\theta_W$ in the rotational direction $Q_W$ around the rotational axis $W_S$. In other words, in the embodiment, the apparatus coordinate system $\Sigma_S$ at time t after the reference time t0 will be described as a coordinate system having an axis that is obtained by rotating each axis of the reference apparatus coordinate system $\Sigma_{S0}$ by the angle $\theta_W$ around the rotational axis $W_S$.

The terminal apparatus 10 captures an image of a virtual space SP-V with a virtual camera CM that is present in the virtual space SP-V. The terminal apparatus 10 causes the display 12 to display a display image GH representative of a result of an image captured by the virtual camera CM.

1.2 Virtual Space and Virtual Camera

The virtual space SP-V and the virtual camera CM will be described with reference to FIGS. 3 to 6.

Figure 3:
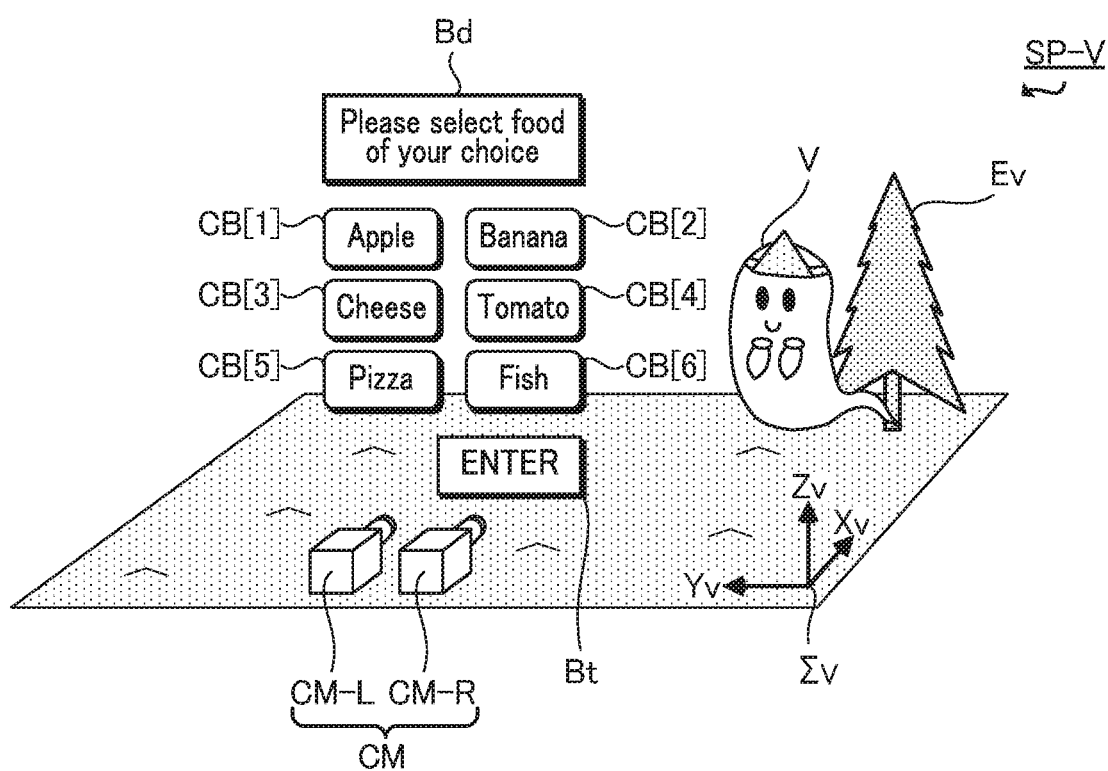
FIG. 3 is an explanatory diagram for an example virtual space SP-V.

FIG. 3 is an explanatory diagram for the virtual space SP-V.

In the embodiment, as shown in FIG. 3, an example case is assumed in which the following are provided in the virtual space SP-V: environment components Ev composing the virtual space SP-V, such as a virtual ground, mountains, trees or the like; a virtual character V; optional objects CB representative of options; an enter button Bt (an example of a "predetermined object") for selecting one or more options selected by the user from among the options; a virtual message board Bd for displaying information on the options; and the virtual camera CM for capturing an image of the virtual space SP-V. In the embodiment, an example case is assumed in which K optional objects CB[1] to CB[K] for representing K options are provided in the virtual space SP-V (K represents a natural number satisfying K≥2). In the following description, the kth optional object CB from among the K optional objects CB[1] to CB[K] is referred to as an "optional object CB[k] (k represents a natural number satisfying 1≤k≤K).

In the embodiment, as shown in FIG. 3, an example case is assumed in which the virtual camera CM is composed of a left-eye virtual camera CM-L and a right-eye virtual camera CM-R. For the sake of clarity, as shown in FIG. 3, a coordinate system fixed to the virtual space SP-V, which is referred to as "a virtual space coordinate system $\Delta_V$", will be used. Here, the "virtual space coordinate system $\Delta_V$" refers to a three-axis orthogonal coordinate system that has an $X_V$-axis, a $Y_V$-axis, and a $Z_V$-axis orthogonal to one another and has the origin at a predetermined position in the virtual space SP-V, for example.

Figure 4:
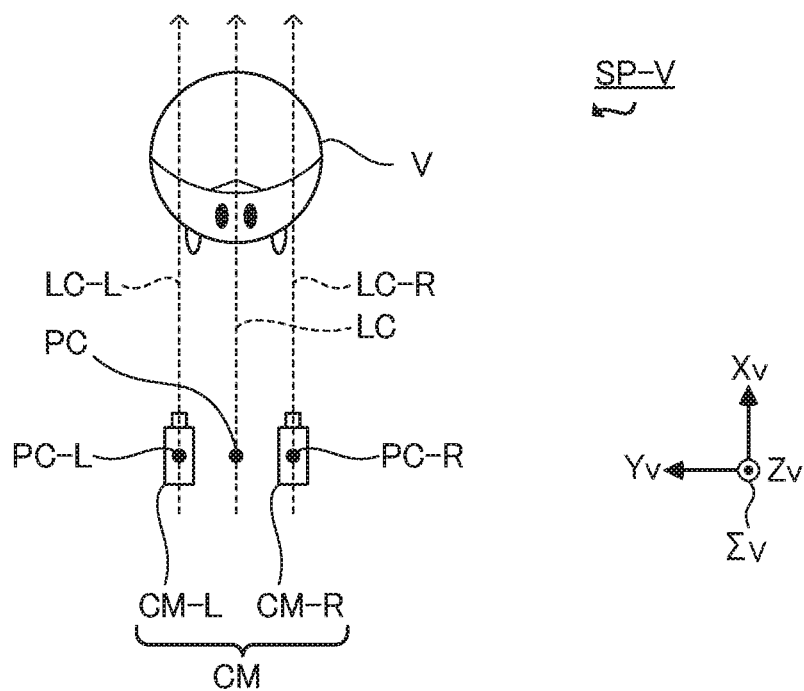
FIG. 4 is an explanatory diagram for an example virtual camera CM in the virtual space SP-V.

FIG. 4 is an explanatory diagram for the virtual camera CM in the virtual space SP-V. FIG. 4 shows an exemplary case in which the virtual space SP-V is viewed in planar view from the $+Z_V$ direction. FIG. 4 also shows an exemplary case in which the virtual camera CM captures an image of the character V in a direction that is in front of the character V.

In the following description, as shown in FIG. 4, a "position PC" will be defined as follows: the position PC indicates the midpoint between a position PC-L of the virtual camera CM-L in the virtual space SP-V and a position PC-R of the virtual camera CM-R in the virtual space SP-V. Furthermore, in the following description, as shown in FIG. 4, a "virtual straight line LC-L" will be defined as follows: the virtual straight line LC-L represents a virtual straight line that intersects with a position PC-L and extends in an optical axis direction of the virtual camera CM-L. Likewise, a "virtual straight line LC-R" will be defined as follows: the virtual straight line LC-R represents a virtual straight line that intersects with position PC-R and extends in an optical axis direction of the virtual camera CM-R. Furthermore, in the following description, a virtual straight line LC (an example of a "virtual line") will be described by the virtual straight line LC representative of a virtual straight line that intersects with the position PC. The virtual straight line LC extends in a direction indicated by the sum of a unit vector representative of the optical axis direction of the virtual camera CM-L and a unit vector representative of the optical axis direction of the virtual camera CM-R. In the embodiment, an example case is presumed in which the virtual camera CM is present at the position PC, and the optical axis of the virtual camera CM is a virtual straight line LC. Furthermore, in the embodiment, an example case is assumed in which the direction in which the virtual straight line LC-L extends is the same as that of the virtual straight line LC-R. For this reason, in the embodiment, the direction in which the virtual straight line LC extends is the same as each of the directions in which the virtual straight line LC-L extends and the virtual straight line LC-R extends.

Figure 5:
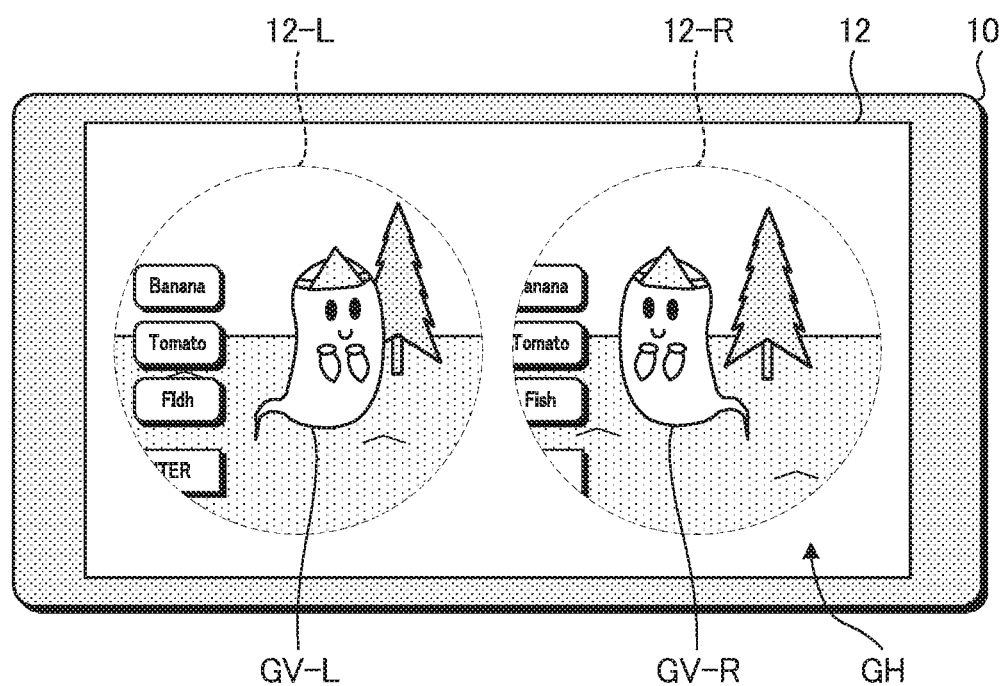
FIG. 5 is an explanatory diagram for an example display image GH.

FIG. 5 is a drawing of an example display image GH representative of a result of an image of the virtual space SP-V captured by the virtual camera CM. In FIG. 5, a case is assumed in which the virtual camera CM captures an image of the character V in a direction that is in front of the character V, as shown in FIG. 4.

As shown in FIG. 5, the display 12 displays, on a left-eye viewing area 12-L that is viewed through the opening 92L, a result of an image captured by the virtual camera CM-L, e.g., a character image GV-L representative of a result of an image of the character V captured by the virtual camera CM-L. Likewise, the display 12 displays, on a right-eye viewing area 12-R that is viewed through the opening 92R, an image captured by the virtual camera CM-R. e.g., a character image GV-R representative of a result of an image of the character V captured by the virtual camera CM-R. In other word, the user U is able to view the character image GV-L with the left eye and view the character image GV-R with the right eye. For this reason, as will be described later with reference to FIG. 7 and other drawings, the user U is able to view, on the display 12, virtual objects, such as the character V and the like in the virtual space SP-V, for example, a visible image GS represented as a three-dimensional object. The "three-dimensional object" is simply required to be an object that is disposed in the virtual three-dimensional space. For example, the "three-dimensional object" may be a three-dimensional object that is disposed in the virtual three-dimensional space, may be a two-dimensional object that disposed in the virtual three-dimensional space, or may be a one-dimensional object that is disposed in the virtual three-dimensional space. The "virtual object" may be an object or region in which a display mode of color, pattern or the like differs from the surroundings, in the virtual space SP-V.

Figure 6:
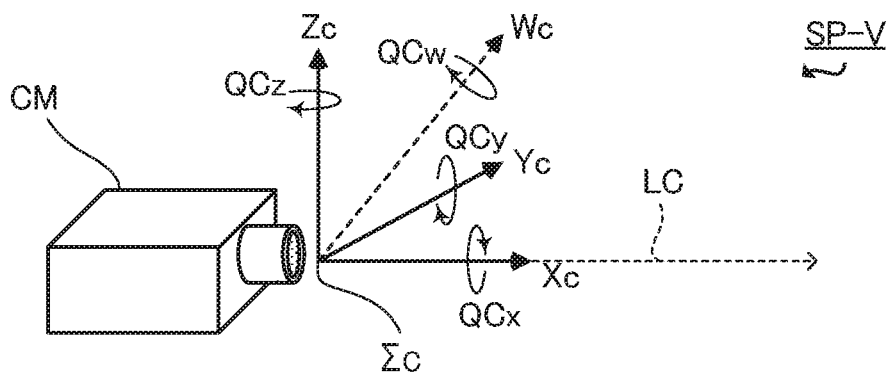
FIG. 6 is an explanatory diagram for an example change in orientation of the virtual camera CM in the virtual space SP-V.

For the sake of clarity, as shown in FIG. 6, a coordinate system fixed to the virtual camera CM in the virtual space SP-V, which is referred to as "a camera coordinate system $\Sigma_C$," will be used. Here, the camera coordinate system $\Sigma_C$ refers to three orthogonal coordinates that has an $X_C$-axis, a $Y_C$-axis and a $Z_C$-axis orthogonal to one another and has the origin at the position PC where the virtual camera CM exists in the virtual space SP-V, for example. In the embodiment, an example case is assumed in which when the user U wears the HMD 1, the camera coordinate system $\Sigma_C$ is set as follows. When viewed by the user U, a $+X_C$ direction represents a direction that is in front of the user U. When viewed by the user U, a $+Y_C$ direction represents a direction that is to the left. When viewed by the user U, a $+Z_C$ direction represents an upward direction. In other words, in the embodiment, an example case is assumed in which when viewed by the user U wearing the HMD 1, the $X_C$-axis is the same direction as the $X_S$-axis, the $Y_C$-axis is the same direction as the $Y_S$-axis, and the $Z_C$-axis is the same direction as the $Z_S$-axis. Furthermore, in the embodiment, an example case is assumed in which the $X_C$-axis corresponds to the virtual straight line LC. In other words, in the embodiment, an example case is assumed in which the virtual straight line LC extends in the direction that is in front of the user U wearing the HMD 1.

As shown in FIG. 6, the virtual camera CM is rotatable in a desired rotational direction that is obtained by combining some or all of a roll direction $QC_X$ representative of the rotational direction around the $X_C$-axis, a pitch direction $QC_Y$ representative of the rotational direction around the $Y_C$ axis, and a yaw direction $QC_Z$ representative of the rotational direction around the $Z_C$-axis. In the embodiment, an example case is given in which when the HMD 1 rotates in the rotational direction $Q_W$ around the rotational axis $W_S$ by an angle $\theta_W$, the virtual camera CM rotates by an angle $\theta_C$ in the rotational direction $Q_{CW}$ around the rotational axis $W_C$. Here, the rotational axis $W_C$ corresponds to, for example, a straight line that intersects the position PC. Specifically, the rotational axis $W_C$ represents a straight line in which the component of a unit vector representative of the direction of the rotational axis WS in the apparatus coordinate system $\Sigma_S$ is the same as that of a unit vector representative of the direction of the rotational axis $W_C$ in the camera coordinate system $\Sigma_C$. Furthermore, the angle $\theta_C$ is equal to the angle $\theta_W$, for example. In the following description, the camera coordinate system $\Sigma_C$ at the reference time t0 will be referred to as a reference camera coordinate system $\Sigma_{C0}$. In other words, the camera coordinate system $\Sigma_C$ at time t will be described as a coordinate system that has coordinate axes obtained by rotating each coordinate axis of the reference camera coordinate system $\Sigma_{C0}$ by the angle $\theta_C$ around the rotational axis $W_C$.

1.3. Images Displayed on Display

The visible image GS displayed on the display 12 will be described below with reference to FIGS. 7 to 12.

Figure 7:
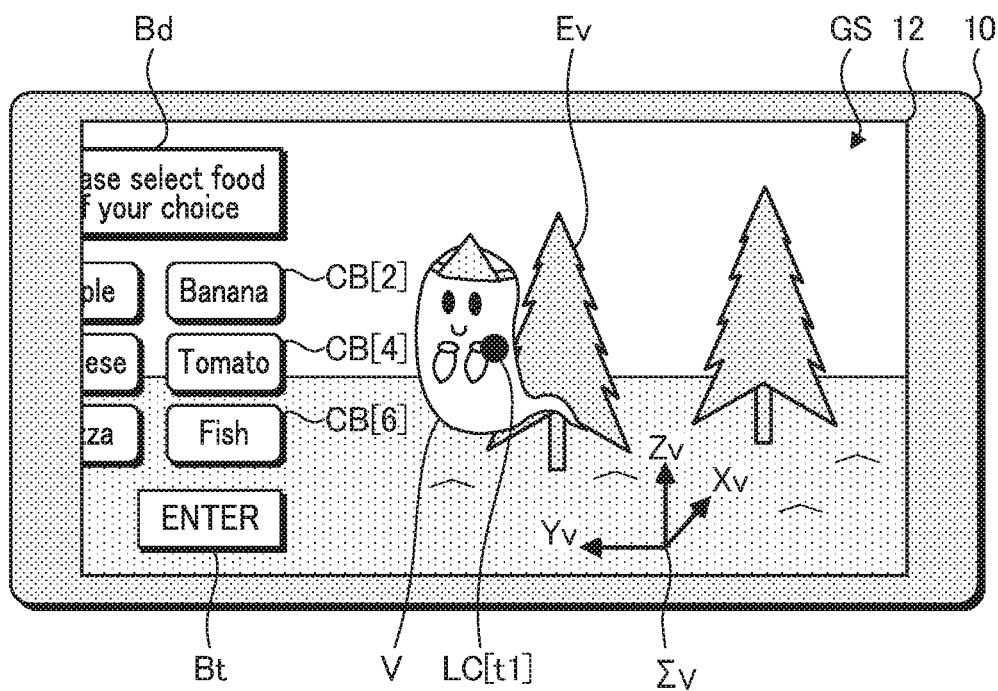
FIG. 7 is an explanatory diagram for an example visible image GS.
Figure 8:
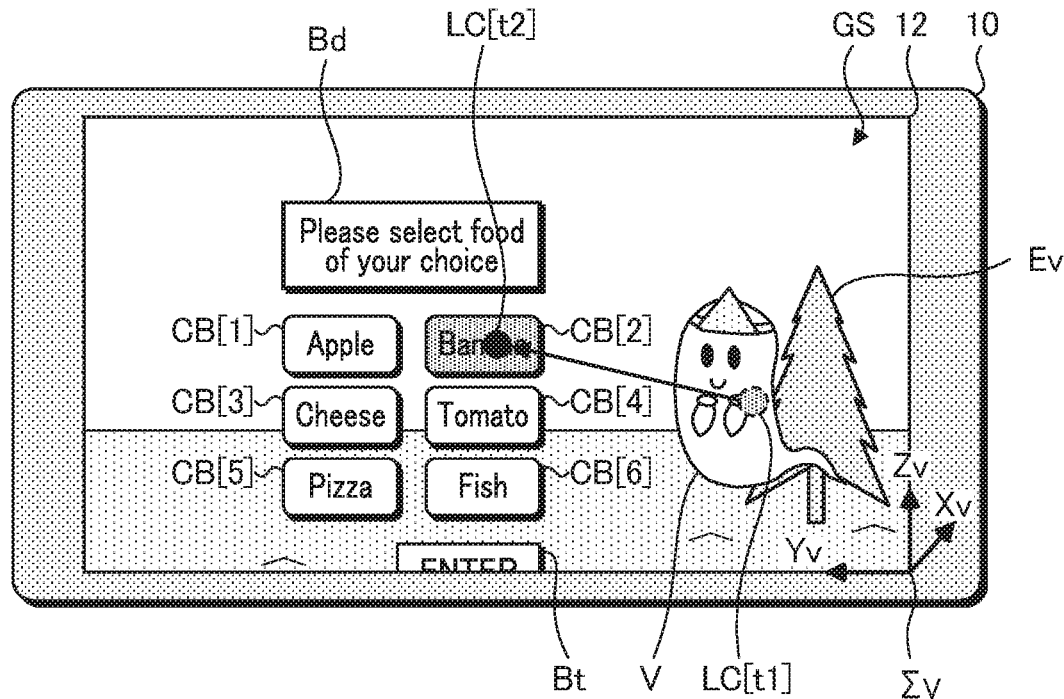
FIG. 8 is an explanatory diagram for an example visible image GS.
Figure 9:
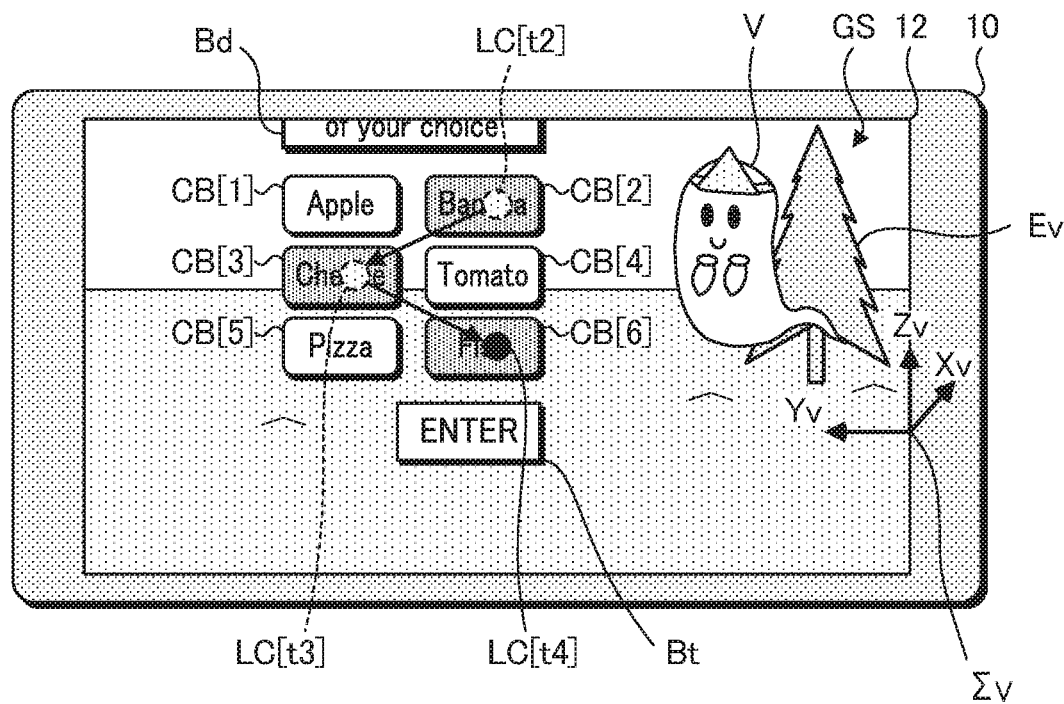
FIG. 9 is an explanatory diagram for an example visible image GS.
Figure 10:
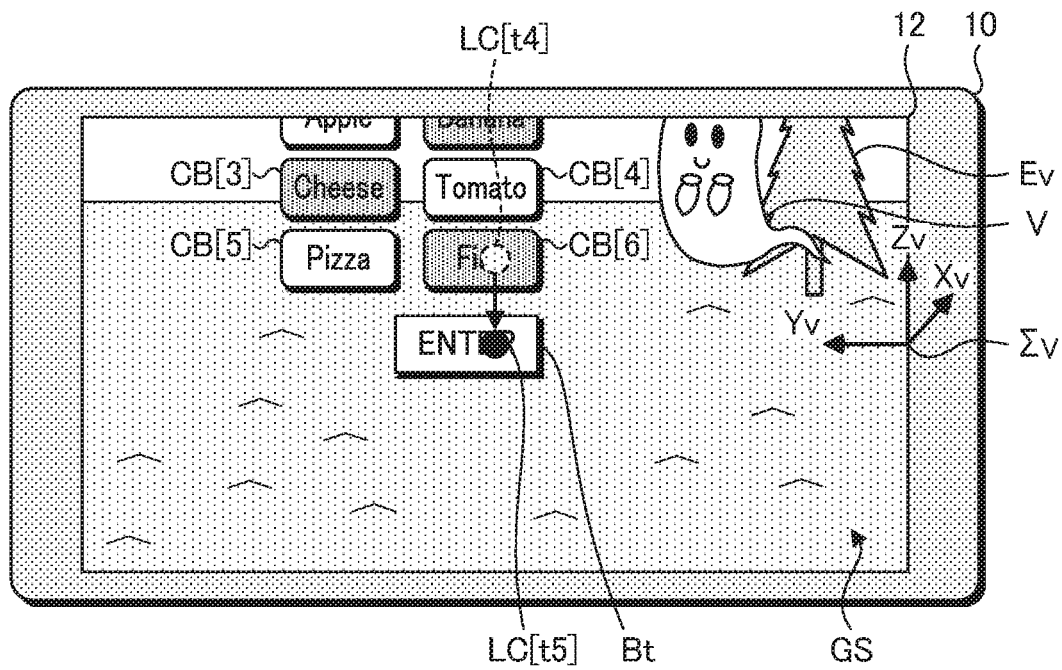
FIG. 10 is an explanatory diagram for an example visible image GS.
Figure 11:
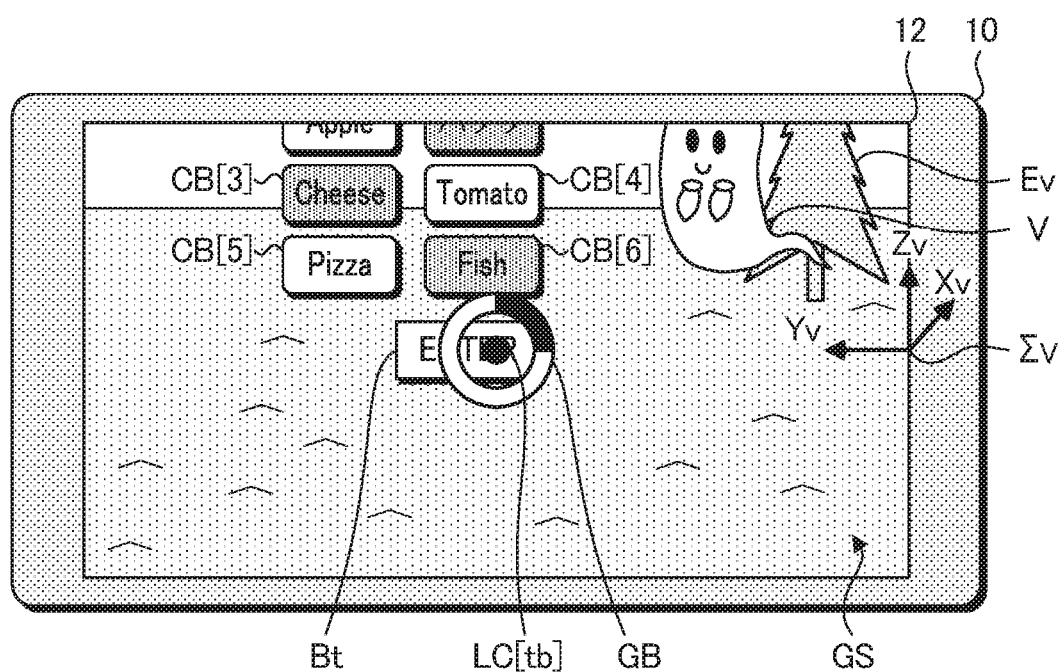
FIG. 11 is an explanatory diagram for an example visible image GS.

FIGS. 7 to 10 show examples of change in the visible image GS displayed on the display 12 from time t1 to time t5, time t1 coming after the reference time t0. Among these drawings, FIG. 7 shows an example of a visible image GS displayed on the display 12 at time t1. FIG. 8 shows an example of a visible image GS displayed on the display 12 at time t2 after time t1. FIG. 9 shows an example of a visible image GS displayed on the display 12 at time t4 after time t2. FIG. 10 shows an example of a visible image GS displayed on the display 12 at time t5 after time t4. FIG. 11 shows an example of a visible image GS displayed on the display 12 for a period from time tb1 to time tb5. In the embodiment, an example case is assumed in which time tb1 is the same as the time t5. In the following description, anytime in the period from time tb1 to time tb5 is referred to as time tb. For the sake of clarity, change in the visible image GS in the period from time t1 to time tb5, shown in FIGS. 7 to 11, is occasionally referred to as "screen-change examples." In the screen-change examples, a case is assumed in which six optional objects CB[1] to CB[6] exist in the virtual space SP-V (that is, a case of "K=6"). In the following description, a virtual straight line LC at time t may on occasion be described as virtual straight line LC[t].

As shown in FIGS. 7 to 1, in the embodiment, the visible image GS includes some or all of the following: the character V viewed, as a three-dimensional object disposed in the virtual space SP-V, by the user U wearing the HMD 1; the optional objects CB[1] to CB[K] viewed, as three-dimensional objects disposed in the virtual space SP-V, by the user U; the message board Bd viewed, as a three-dimensional object disposed in the virtual space SP-V, by the user U; the enter button Bt viewed, as a three-dimensional object disposed in the virtual space SP-V, by the user U; and the environment components Ev disposed in the virtual space SP-V, by the user U. In the embodiment, for the sake of clarity, a case is assumed in which, in the virtual space SP-V, positions of the optional objects CB[1] to CB[K], the message board Bd, and the enter button Bt remain unchanged. However, the present invention is not limited to such an aspect. In the virtual space SP-V, the positions of the optional objects CB[1] to CB[K], the message board Bd, and the enter button Bt may change. For example, the optional objects CB[1] to CB[K], the message board Bd, and the enter button Bt each may be disposed at a constant position all the time when viewed by the camera coordinate system $\Sigma_C$. That is, the positions of each of the optional objects CB[1] to CB[K], the message board Bd, and the enter button Bt in the virtual space coordinate system $\Sigma_V$ may change according to a change in orientation of the virtual camera CM.

In screen-change examples shown in FIGS. 7 to 11, a case is assumed as follows. A virtual straight line LC[t1] intersects with the character V at time t. A virtual straight line LC[t2] intersects with an optional object CB[2] at time t2. A virtual straight line LC[t3] intersects with an optional object CB[3] at time t3. A virtual straight line LC[t4] intersects with an optional object CB[6] at time t4. A virtual straight line LC[t5] intersects with the enter button Bt at time t5. After that, a virtual straight line LC[tb] continues to intersect with the enter button Bt until time tb5.

The user U wearing the HMD 1 identifies one or more optional objects CB from among the K options displayed in the K optional objects CB[1] to CB[K], and after that selects the identified one or more optional objects CB, thereby enabling selecting one or more options corresponding to one or more optional objects CB.

Specifically, the user U wearing the HMD 1 first operates the orientation of the HMD 1 such that an optional object CB[k] and a virtual straight line LC intersect each other (an example of a "predetermined positional relationship") in the virtual space SP-V, thereby enabling identifying the optional object CB[k] as an optional object subject. However, the present invention is not limited to such an aspect. The user U wearing the HMD 1 may operates the orientation of the HMD 1 to identify the optional object CB[k] as the optional object subject such that a distance between the optional object CB[k] and the virtual straight line LC is less than or equal to a predetermined distance (another example of a "predetermined positional relationship") in the virtual space SP-V. In the embodiment, a case is assumed in which the following (a-i) and (a-ii) are displayed in the visible image GS in different display modes: (a-i) an optional object CB that is identified as an optional object subject; and (a-ii) an optional object CB that is not yet identified as an optional object subject. Specifically, in the embodiment, an example case is assumed in which the optional object CB which is identified as the optional object subject and the optional object CB which is not yet identified as the optional object subject are displayed in the visible image GS in different colors. However, the present invention is not limited to such an aspect. The optional object CB which is identified as the optional object subject and the optional object CB which is not yet identified as the optional object subject may be displayed in different shapes, may be displayed in different sizes, may be displayed in different brightness levels, may be displayed in different transparency levels, or may be displayed in different patterns. In the screen-change examples shown in FIGS. 7 to 11, as described above, the virtual straight line LC intersects with each of the optional objects CB[2], CB[3] and CB[6]. For this reason, in the screen-change examples, these optional objects CB[2], CB[3] and CB[6] each is identified as an optional object subject.

In the embodiment, the user U wearing the HMD 1 identifies one or more optional objects CB from among the optional objects CB[1] to CB[K], and after that the user U operates the orientation of HMD 1 such that the enter button Bt and the virtual straight line LC intersect each other for a predetermined time length ΔT1 (an example of "predetermined time length") in the virtual space SP-V, thereby enabling selection of the one or more optional objects CB identified as the optional object subjects. In the following description, a "selection-decided period (an example of "first period")" will be defined by the time length ΔT1 at which the enter button Bt and the virtual straight line LC intersect each other, when one or more optional objects CB, which are identified as the optional object subjects, are selected. The screen-change examples shown in FIGS. 7 to 11 show an exemplary case in which the period from time tb1 to time tb5 corresponds to the selection-decided period. In the embodiment, as shown in FIG. 11, in the selection-decided period, a gauge image GB is displayed, as a virtual object disposed in the virtual space SP-V, on the visible image GS.

Figure 12:
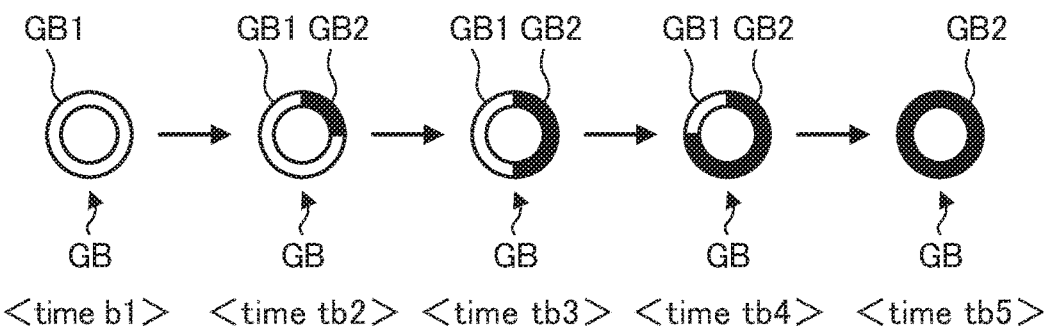
FIG. 12 is an explanatory diagram for an example display mode of a gauge image GB.

FIG. 12 is an explanatory diagram for an example of a gauge image GB according to the modification. In the modification, as shown in FIG. 12, a case is assumed in which the display mode of the gauge image GB changes over time. Specifically, in the modification, an example case is assumed in which the gauge image GB includes at least one of the following: an image GB1 representative of a time length from the current time to the end time of the selection-decided period; and an image GB2 representative of a time length from the start of the selection-decided period to the current time. Furthermore, in the embodiment, an example case is assumed in which the ratio of the image GB1 to the gauge image GB decreases over time and the ratio of the image GB2 to the gauge image GB increases over time. For example, in an example of FIG. 12, all of the entire gauge image GB is filled with the image GB1 at time tb at which the selection-decided period starts. Subsequently, the ratio of the image GB2 to the gauge image GB increases as the time progresses from time tb2 to time tb3, and from tb3 to time tb4. After that, the entire gauge image GB is filled with the image GB2 at time tb5 at which the selection-decided period ends. For this reason, in an example of FIG. 12, the user U wearing the HMD 1 is able to visually acknowledge the remaining time of the selection-decided period from the gauge image GB. In the embodiment, the gauge image GB is displayed at the same time when the selection-decided period starts. However, the present invention is not limited to such an aspect. For example, the gauge image GB may be displayed after a certain time has elapsed from the start time of the selection-decided period. In the embodiment, as shown in FIG. 11, the gauge image GB is displayed at a position where at least a portion of the gauge image GB and at least a portion of the enter button Bt overlap when viewed by the virtual camera CM. However, the present invention is not limited to such an aspect. For example, the gauge image GB may be displayed at a freely selected position on the visible image GS.

As described above, in examples shown in FIGS. 7 to 11, in the period from time t1 to time t5, the virtual straight line LC intersects with each of the optional objects CB[2], CB[3] and CB[6]. After that, in the selection-decided period having the time length ΔT1 from time tb1 to time tb5, the virtual straight line LC intersects with the enter button Bt. For this reason, in the screen-change examples shown in FIGS. 7 to 11, the user U wearing the HMD 1 is able to identify the optional objects CB[2], CB[3] and CB[6] as the optional object subjects in the period from time t1 to time t5. After that, the user U is able to selects the optional objects CB[2], CB[3] and CB[6] in the period from time tb1 to time tb5.

2. Configuration of Terminal Apparatus

The configuration of the terminal apparatus 10 will be described below with reference to FIGS. 13 and 14.

Figure 13:
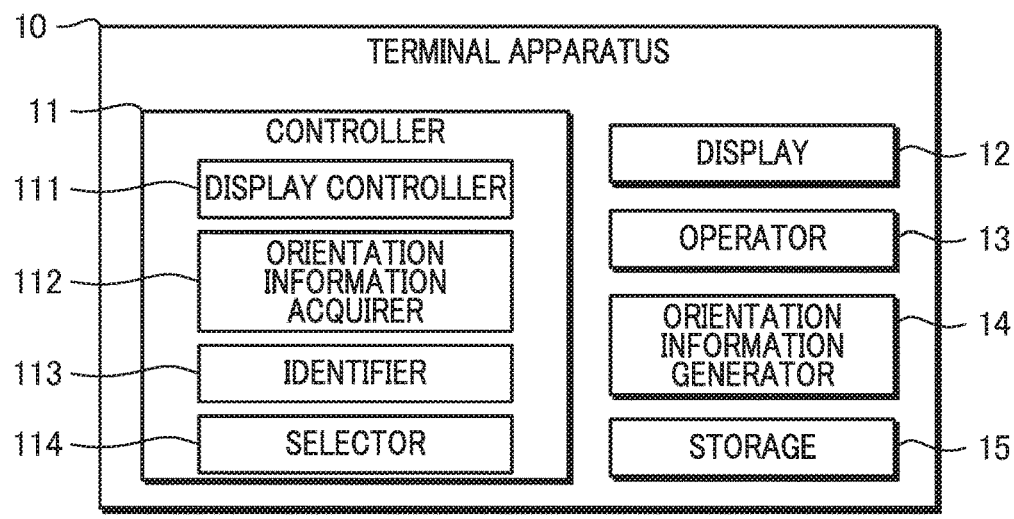
FIG. 13 is an example block diagram for the configuration of a terminal apparatus 10.

FIG. 13 is a block diagram for an example of a configuration of the terminal apparatus 10.

As shown in FIG. 11, the terminal apparatus 10 includes: the display 12 that displays an image; a controller 11 that controls each component of the terminal apparatus 10 and executes display processing for displaying the display image GH on the display 12; an operator 13 that receives an input operation carried out by the user U of the terminal apparatus 10; an orientation information generator 14 that detects a change in orientation of the terminal apparatus 10 and outputs orientation information B representative of a detection result; and a storage 15 that stores therein various information including a control program PRG for the terminal apparatus 10.

In the embodiment, for example, a three-axis angular velocity sensor 1002 (see FIG. 14) is employed as the orientation information generator 14. Specifically, the orientation information generator 14 includes an X-axis angular velocity sensor that detects a change in orientation in the roll direction $Q_X$ per unit time, a Y-axis angular velocity sensor that detects a change in orientation in the pitch direction $Q_Y$ per unit time, and a Z-axis angular velocity sensor that detects a change in orientation in the yaw direction $Q_Z$. The orientation information generator 14 periodically outputs the orientation information B representative of detection results obtained by the X-axis angular velocity sensor, the Y-axis angular velocity sensor and the Z-axis angular velocity sensor.

The controller 11 includes a display controller 111, an orientation information acquirer 112, an identifier 113 and selector 114.

The orientation information acquirer 112 (an example of an "acquirer") acquires orientation information B output from the orientation information generator 14. The display controller 111 controls, based on the orientation information B acquired by the orientation information acquirer 112, the orientation of the virtual camera CM in the virtual space SP-V. The display controller 111 generates image information DS indicative of a result of an image captured by the virtual camera CM, and supplies the image information DS to the display 12, to cause the display 12 to display the display image GH. The identifier 113 identifies an optional object CB that intersects with the virtual straight line LC, as the optional object subject. The selector 114 selects the optional object CB identified by the identifier 113, as the optional object subject.

Figure 14:
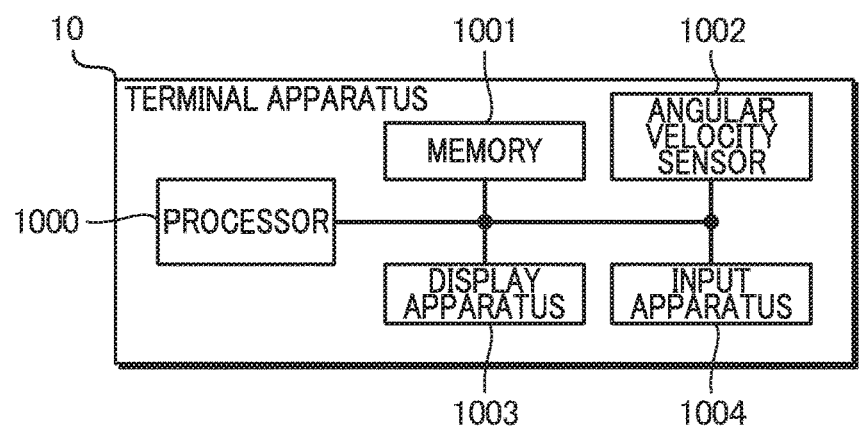
FIG. 14 is an example of a hardware configuration diagram for the terminal apparatus 10.

FIG. 14 shows an example of a hardware configuration diagram for the terminal apparatus 10.

As shown in FIG. 14, the terminal apparatus 10 includes: a processor 1000 that controls each component of the terminal apparatus 10; a memory 1001 that stores thereon various information, the angular velocity sensor 1002 that detects a change in orientation of the terminal apparatus 10 and outputs the orientation information B indicative of a detection result; a display apparatus 1003 that displays various images; and an input apparatus 1004 that accepts an input operation carried out by the user U of the terminal apparatus 10. In the embodiment, the terminal apparatus 10 is described as an "information processing apparatus." However, the present invention is not limited to such an aspect. The processor 1000 provided in the terminal apparatus 10 may be the "information processing apparatus."

The memory 1001 is a non-transitory recording medium. For example, the memory 1001 includes either or both of the following: a volatile memory, such as Random Access Memory (RAM) or the like, which serves as a working area for the processor 1000; and a non-volatile memory, such as an Electrically Erasable Programmable Read-Only Memory (EEPROM) or the like, which is used for storing various information, such as the control program PRG or the like of the terminal apparatus 10. The memory 1001 serves as the storage 15. In the embodiment, the memory 1001 is exemplified as a "recording medium" in which the control program PRG is recorded. However, the present invention is not limited to such an aspect. The "recording medium" in which the control program PRG is recorded may be a storage provided in an external apparatus existing outside the terminal apparatus 10. For example, the "recording medium" on which the control program PRG is recorded may be a storage that is provided outside the terminal apparatus 10. The storage may be provided in a distribution server apparatus that has the control program PRG and distributes the control program PRG. The processor 1000 is, for example, a Central Processing Unit (CPU). The processor 1000 executes the control program PRG stored in the memory 1001, and operates according to the control program PRG, to serve as the controller 11. As described above, the angular velocity sensor 1002 includes the X-axis angular velocity sensor, the Y-axis angular velocity sensor, and the Z-axis angular velocity sensor. The angular velocity sensor 1002 serves as the orientation information generator 14. Both the display apparatus 1003 and the input apparatus 1004 are constitute of a touch panel, for example. The display apparatus 1003 serves as the display 12 and the input apparatus 1004 serves as the operator 13. The display apparatus 1003 and the input apparatus 1004 may be configured separately from each other. The input apparatus 1004 may be configured by one or more components including some or all of a touch panel, operation buttons, a keyboard, a joystick, and a pointing device, such as a mouse.

It is of note that the processor 1000 may be configured to include additional hardware, such as a Graphics Processing Unit (GPU), a Digital Signal Processor (DSP) or a Field Programmable Gate Array (FPGA) or the like, in addition to the CPU or in place of the CPU. In this case, some of or all of the functionality of the controller 11 realized by the processor 1000 may be realized by other hardware, such as a DSP or the like. The processor 1000 may be configured to further include some or all of the following: one or a plurality of CPUs; and one or a plurality of hardware elements. For example, when the processor 1000 may be configured to include a plurality of the CPUs, some or all of features of the controller 11 may be realized by collaborative operation carried out by the plurality of the CPUs in accordance with the control program PRG.

3. Operation of Terminal Apparatus

An example operation of the terminal apparatus 10 will be described below with reference to FIGS. 15 and 16.

Figure 15:
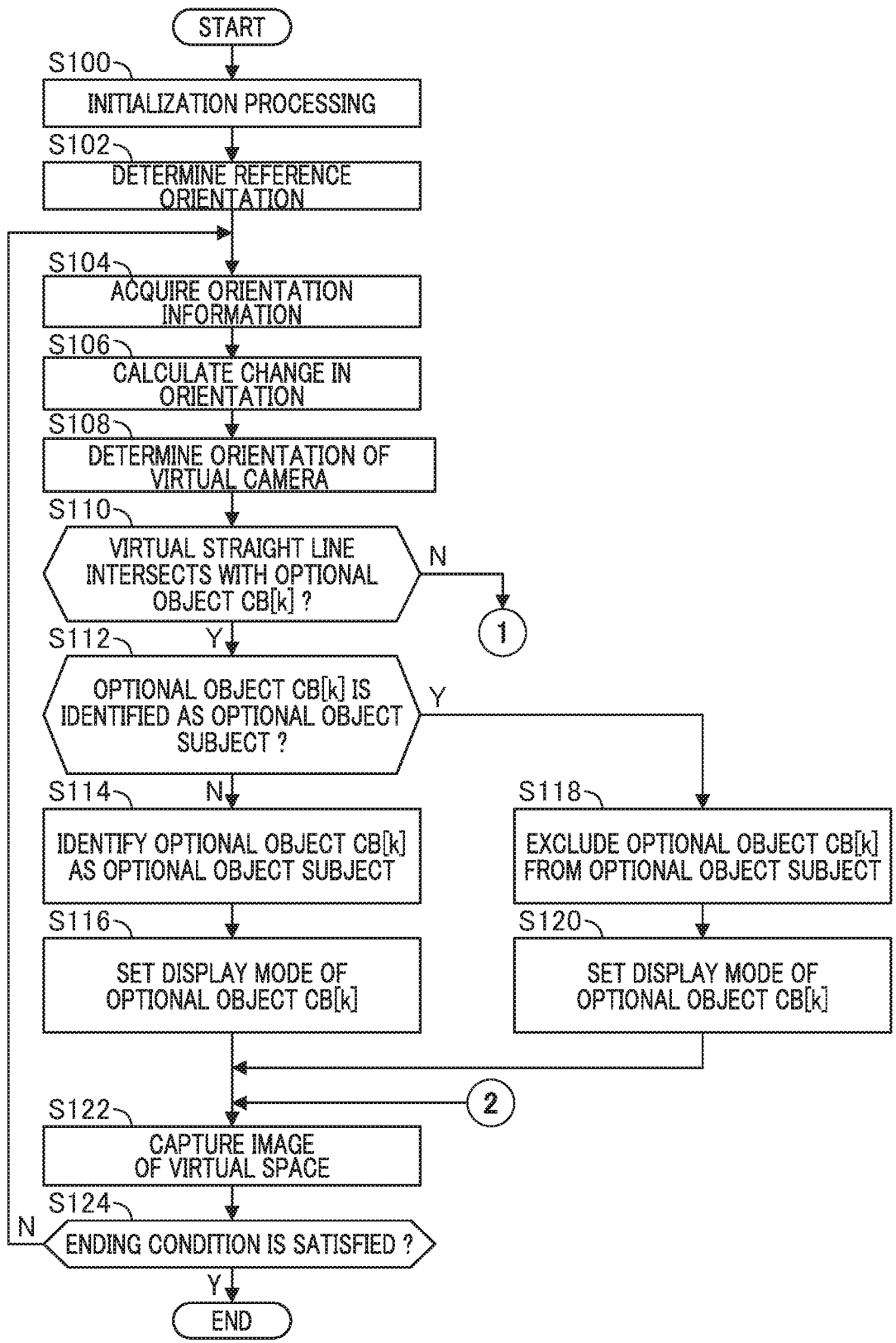
FIG. 15 is a flowchart showing an example of an operation of the terminal apparatus 10.
Figure 16:
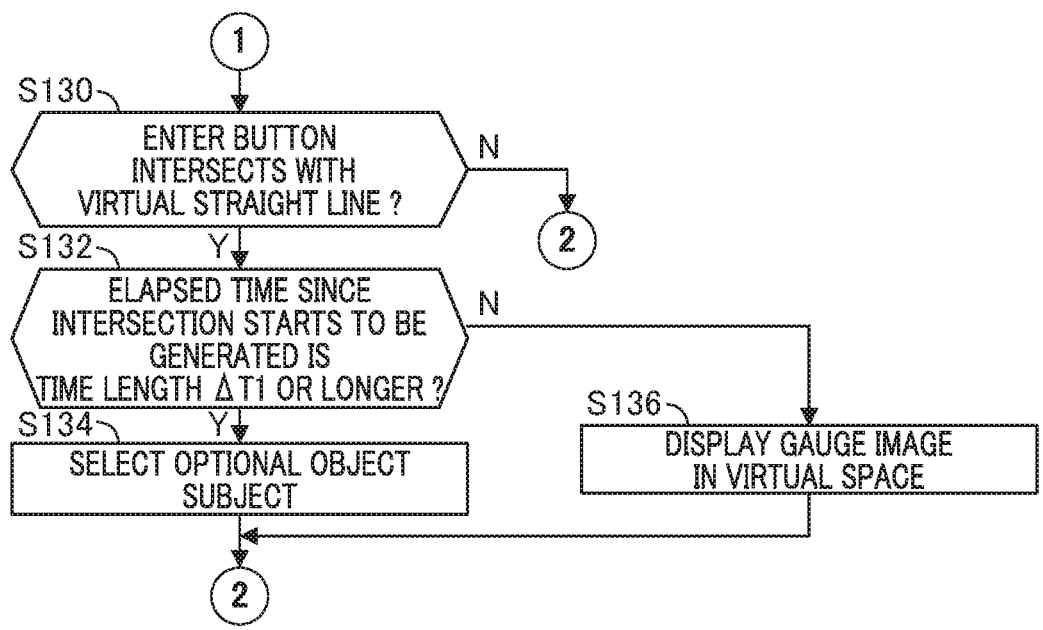
FIG. 16 is a flowchart showing an example of an operation of the terminal apparatus 10.

FIGS. 15 and 16 are each a flowchart showing an example operation of the terminal apparatus 10 when the terminal apparatus 10 executes display processing for displaying a display image GH on the display 12. In the embodiment, an example case is assumed in which when the user U inputs a predetermined starting operation for starting the display processing with the operator 13, the terminal apparatus 10 starts the display processing.

As shown in FIG. 15, when the display processing is started, the display controller 111 executes an initialization processing (S100). Specifically, in the initialization processing at step S100, the display controller 111 disposes optional objects CB, an enter button Bt, a message board Bd, a character V and environment components Ev and the like in the virtual space SP-V to the predetermined positions in the virtual space SP-V or to random positions in the virtual space SP-V. Furthermore, in the initialization processing at step S100, the display controller 111 sets an orientation of the virtual camera CM in the virtual space SP-V to the predetermined initial orientation.

Subsequently, the display controller 111 determines time at which the initialization processing has been completed as the reference time t0, and determines the orientation of the HMD 1 at the reference time t0 as a "reference orientation" (S102). At step S102, the display controller 111 determines the apparatus coordinate system $\Sigma_S$ at the reference time t0 as the reference apparatus coordinate system $\Sigma_{S0}$. Furthermore, at step S102, the display controller 111 sets the camera coordinate system $\Sigma_C$ such that the direction of each coordinate axis of the camera coordinate system $\Sigma_C$ is the same as that of each coordinate axis of the apparatus coordinate system $\Sigma_S$ when viewed by the user U wearing the HMD 1. At step S102, the display controller 111 determines the camera coordinate system $\Sigma_C$ at the reference time t0 as the reference camera coordinate system $\Sigma_{C0}$. In the following description, a virtual straight line LC at the reference time t0 will be referred to as a reference straight line LC0.

Subsequently, the orientation information acquirer 112 acquires the orientation information B from the orientation information generator 14 (S104).

Then, the display controller 111 calculates, based on the orientation information B acquired by the orientation information acquirer 112 at step S104, a change dB in orientation from the reference orientation of the HMD 1 (S106). In the embodiment, for example, the change dB in orientation obtained by the display controller 111 is described by the following: the rotational axis $W_S$ viewed by the reference apparatus coordinate system $\Sigma_{S0}$; and the angle $\theta_W$ around the rotational axis $W_S$. In other words, in the embodiment, when the HMD 1 rotates by the angle $\theta_W$ around the rotational axis $W_S$ as viewed by the reference apparatus coordinate system $\Sigma_{S0}$, the change dB in orientation includes a direction vector representative of the rotational axis $W_S$ in the reference apparatus coordinate system $\Sigma_{S0}$ and the angle $\theta_W$. However, the change dB in orientation may be described by any other expression method. For example, the change dB in orientation may be described by an orientation conversion matrix indicating a change in orientation from the reference apparatus coordinate system $\Sigma_{S0}$ to the apparatus coordinate system $\Sigma_S$, or may be described by quaternions indicative of a change in orientation from the reference apparatus coordinate system $\Sigma_{S0}$ to the apparatus coordinate system $\Sigma_S$.

Subsequently, the display controller 111 determines, based on the change dB in orientation calculated at step S106, the orientation of the virtual camera CM in the virtual space SP-V (S108). Specifically, at step S108, first, the display controller 111 sets the rotational axis $W_C$, based on the rotational axis $W_S$ indicating the change dB in orientation calculated at step S106. Furthermore, the display controller 111 sets the angle $\theta_C$, based on the angle $\theta_W$ indicating the change dB in the orientation. Subsequently, the display controller 111 sets the camera coordinate system $\Sigma_C$ as a coordinate system obtained by rotating the reference camera coordinate system $\Sigma_{C0}$ around the rotational axis $W_C$ by the angle $\theta_C$, to determine the orientation of the virtual camera CM. In other words, at step S108, the display controller 111 sets the virtual straight line LC as a straight line obtained by rotating the reference straight line LC0 around the rotational axis $W_C$ by the angle $\theta_C$. For example, when the HMD 1 rotates by the angle $\theta_W$ around the ZS axis from the reference orientation relative to the yaw direction $Q_Z$, the display controller 111 sets the camera coordinate system $\Sigma_C$ as a coordinate system having an orientation obtained by rotating the reference camera coordinate system $\Sigma_{C0}$ around the $Z_C$ axis by the angle $\theta_W$, to determine the orientation of the virtual camera CM. Furthermore, for example, when the HMD 1 rotates by the angle $\theta_W$ around the $Y_S$-axis from the reference orientation relative to the pitch direction $Q_Y$, the display controller 111 sets the camera coordinate system $\Sigma_C$ as a coordinate system having an orientation obtained by rotating the reference camera coordinate system $\Sigma_{C0}$ around the $Y_C$-axis by the angle $\theta_W$, to determine the orientation of the virtual camera CM. Furthermore, for example, when the HMD 1 rotates by the angle $\theta_W$ around the $X_S$-axis from the reference orientation relative to the roll direction $\theta_X$, the display controller 111 sets the camera coordinate system $\Sigma_C$ as a coordinate system having a orientation obtained by rotating the reference camera coordinate system $\Sigma_{C0}$ around the $X_C$-axis by the angle $\theta_W$, to determine the orientation of the virtual camera CM.

Subsequently, the identifier 113 determines whether an optional object CB[k] that intersects with the virtual straight line LC is present from among the optional objects CB[1] to CB[K] (S10). Alternatively, at step S110, the identifier 113 may determine whether the following optional object CB[k] is present from among the optional objects CB[1] to CB[K] (another example of "predetermined relationship"). The optional object CB[k] is one in which the direction of the extending virtual straight line LC is included in width in the direction from the virtual camera CM to the optional object CB[k]. At step S110, the identifier 113 may determine whether an optional object CB[k], the distance of which to the virtual straight line LC is less than or equal to the predetermined distance, is present from among the optional objects CB[1] to CB[K].

When the result of the determination at step S110 is affirmative, the identifier 113 determines whether the optional object CB[k] that intersects with the virtual straight line LC is identified as the optional object subject (S112). In a period from a time before the current time to the current time, when the virtual straight line LC continues to intersect with the optional object CB[k] at step S112, the identifier 113 maintains the result of the determination at the start time of the period (hereafter, referred to as an "intersection period") during which the intersection is maintained.

When the result of the determination at step S112 is negative, the identifier 113 identifies, as the optional object subject, the optional object CB[k] that is determined to intersect with the virtual straight line LC at step S110 (S114). Then the display controller 111 sets the color of the optional object CB[k] that has been identified, as the optional object subject, by the identifier 113 at step S114 to a color representative of the optional object subject (S116).

When the result of the determination at step S112 is affirmative, the identifier 113 excludes the optional object CB[k] that is determined to intersect with the virtual straight line LC at step S110 from the optional object subject (S118). In other words, when the virtual straight line LC starts to intersect again with the optional object CB[k] that has been identified before, as the optional object subject, by the identifier 113 at step S118, the identifier 113 stops the identification, as the optional object subject, to the optional object CB[k]. Then the display controller 111 sets the color of the optional object CB[k] that has been stopped, as the optional object subject, by the identifier 113 at step S18 to a color not indicative of the optional object subject (S120).

The display controller 111 generates the image information DS indicative of the result of an image of the virtual space SP-V captured by the virtual camera CM, and supplies the image information DS to the display 12, to cause the display 12 to display the display image GH (S122).

As shown in FIG. 16, when the result of the determination at step S110 is negative, the selector 114 determines whether the virtual straight line LC and the enter button Bt intersect each other (S130). When the result of the determination at step S130 is negative, the selector 114 moves the processing to step S122.

When the result of the determination at step S130 is affirmative, the selector 114 determines whether the elapsed time since the intersection of the virtual straight line LC with the enter button Bt starts to be generated is the time length ΔT1 or more (S132). When the result of the determination at step S132 is affirmative, the selector 114 selects one or more optional objects CB identified as the optional object subject from among the optional objects CB[1] to CB[K] (S134). After that, the selector 114 moves the processing to step S122. When the result of the determination at step S132 is negative, the display controller 111 arranges the gauge image GB in the virtual space SP-V (S136), and after that moves the processing to step S122.

In the following description, a condition for selecting one or more optional objects CB identified as the optional object subjects is referred to as a reference orientation condition (an example of "predetermined condition"). As described above, in the embodiment, the selection condition is one in which the virtual straight line LC and the enter button Bt intersect each other for the time length ΔT1. It is of note that the virtual straight line LC extends in a direction that is determined by the change dB in orientation calculated based on the orientation information B. In other words, the direction in which the virtual straight line LC extends is defined by the orientation information B. For this reason, it can be acknowledged that the selection condition with respect to the virtual straight line LC is a condition with respect to the orientation information B.

As shown in FIG. 15, the display controller 111 determines whether the operator 13 has received an input of a predetermined end operation made by the user U, the predetermined end operation being an operation indicative of ending the displaying processing (S24). When the result of the determination at step S124 is negative, the display controller 111 moves the processing to step S104. When the result of the determination at step S124 is affirmative, the display controller 111 ends the display processing.

4. Summary of Embodiment

In the foregoing description, in the embodiment, the display controller 111 determines the direction in which a virtual straight line LC extends, based on the orientation information B indicative of a change in orientation of the HMD 1. In the embodiment, the identifier 113 identifies an optional object CB as an optional object subject, based on the positional relationship between the virtual straight line LC and the optional object CB. In the embodiment, the selector 114 selects the optional object CB identified as the optional object subject, based on the positional relationship between the virtual straight line LC and the enter button Bt. For this reason, according to the embodiment, the user U wearing the HMD 1 changes the orientation of HMD 1, thereby enabling the following: changing the orientation of the virtual camera CM in the virtual space SP-V; identifying an optional object CB as an optional object subject; and selecting the optional object CB identified as the optional object subject. In other words, according to the embodiment, the user U wearing the HMD 1 is able to carry out inputs of various instructions by changing the orientation of the HMD 1.

In the embodiment, on the premise that an optional object CB is identified as an optional object subject, when a virtual straight line LC and the enter button Bt intersect each other, the selector 114 selects the optional object CB. For this reason, according to the embodiment, it is possible to reduce probability of incorrect selection of the optional object CB by the user U wearing the HMD 1 against the intention of the user U, as compared to a case (Reference Example 1) in which the optional object CB is selected when the optional object CB and the virtual straight line LC intersect each other, regardless of whether the optional object CB is identified as the optional object subject.

In the embodiment, the user U wearing the HMD 1 is able to identify an optional object CB by intersecting a virtual straight line LC with the optional object CB for a period that is shorter than the time length ΔT1. In the embodiment, the user U wearing the HMD 1 identifies one or more optional objects CB to be selected, and then intersects the virtual straight line LC with the enter button Bt for the time length ΔT1, thereby enabling selection of the one or more optional objects CB. For this reason, according to the embodiment, when the user U wearing the HMD 1 is about to select a plurality of optional objects CB, the user U is able to make a quick selection of the plurality of optional objects CB, as compared to a case (Reference Example 2) in which the plurality of optional objects CB are selected in which the intersection of the virtual straight line LC with each of the optional objects CB is made for the time length ΔT1, for example. As a result, according to the embodiment, even when the number of optional objects CB to be selected by the user is greater, increase in burden on the user U wearing the HMD 1 is suppressed, as compared to Reference Example 2.

In the embodiment, an optional object CB that is identified as an optional object subject and an optional object CB that is not yet identified as an optional object subject are displayed in different display mode. For this reason, according to the embodiment, the user U wearing the HMD 1 is able to acknowledge with ease whether each optional object CB is identified as the optional object subject.

B. Modifications

Each of the embodiments described above can be variously modified. Specific modification modes will be described below as examples. Two or more modes, freely selected from the following examples can be appropriately combined within a range, as long as they do not conflict with each other. In the modifications described below, elements with substantially the same operational actions or functions as those in the embodiments are denoted by the same reference signs as in the above description, and detailed description thereof will not be presented, as appropriate.

Modification 1

In the foregoing embodiment, when a virtual straight line LC and an optional object CB intersect each other, the identifier 113 identifies the optional object CB regardless of the period of the intersection of both. However, the present invention is not limited to such an aspect. The identifier 113 may identify an optional object CB, when the virtual straight line LC continues to intersect with the optional object CB for a predetermined time length, for example.

Figure 17:
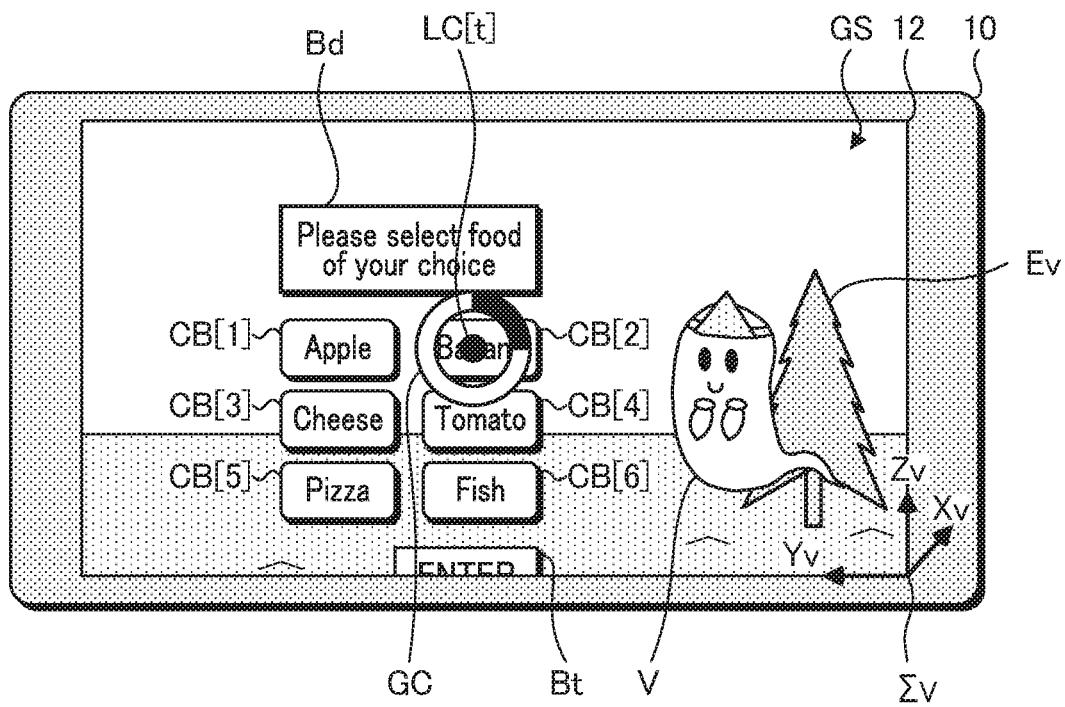
FIG. 17 is an explanatory diagram for a visible image GS according to modification 1.

In the modification, identifier 113 identifies an optional object CB when the virtual straight line LC continues to intersect with the optional object CB with each other for a time length ΔT2 (an example of a "reference period") that is shorter than the time length ΔT1. In the modification, as shown in FIG. 17, the display controller 111 arranges a gauge image GC on a position that corresponds to an optional object CB for the intersection period from the start of intersecting the virtual straight line LC with the optional object CB until the time length ΔT2 elapses. It is of note that in the modification, likewise the gauge image GB, the gauge image GC may be displayed such that the remaining time of the intersection period is visually acknowledged. For example, the gauge image GC may have at least one of the following: an image GC1 representative of the time length from the current time to the end time of the intersection period; and an image GC2 representative of the time length from the start time of the intersection period to the current time. In the modification, a case is assumed in which the gauge image GC starts to be displayed in the visible image GS at the same time when the intersection period starts. However, the gauge image GC may be displayed after a certain time has elapsed from the start of the intersection period.

In the foregoing, in the modification, when an optional object CB continues to intersect with a virtual straight line LC for the time length ΔT2, the optional object CB is identified. For this reason, in the modification, it is possible to reduce probability of incorrect selection of the optional object CB, as compared to a case in which an optional object CB is identified at a time at which the optional object CB intersects with the virtual straight line LC.

Modification 2

In the embodiment and the modification 1 described above, the display controller 111 displays an optional object CB[k] in the selection-decided period in the same display mode as the optional object CB[k] before the selection-decided period is started. However, the present invention is not limited to such an aspect. The display controller 111 may display an optional CB[k] in the selection-decided period in a display mode different from that of the optional object CB[k] before the selection-decided period is started.

Figure 18:
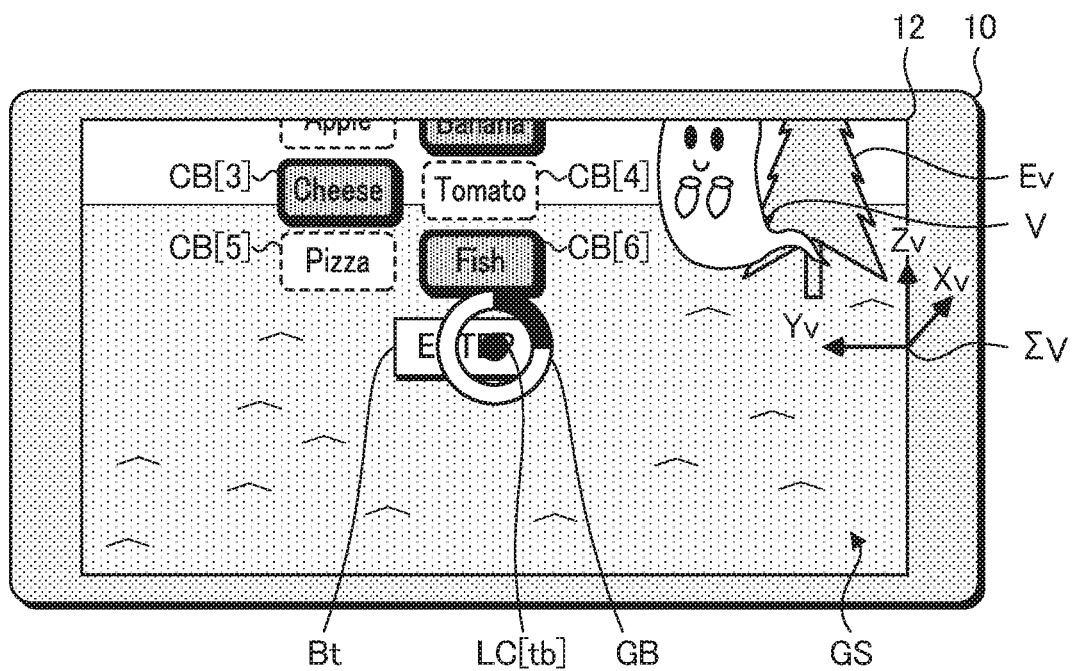
FIG. 18 is an explanatory diagram for an example visible image GS according to modification 2.

FIG. 18 shows an example of a visible image GS according to the modification. In the modification, the display controller 111 causes the display 12 to display a visible image GS, shown in FIGS. 7 to 9, from time t1 to time t4, and after that the display controller 11*l* causes the display 12 to display a visible image GS, shown in FIG. 18, from time tb1 to time tb5. As shown in FIG. 18, the display controller 111 displays an optional object CB[k] in the selection-decided period from time tb1 to time tb5 in a display mode different from an optional object CB[k] in the period from time t1 to time t4. Specifically, when the optional object CB[k] is identified as the optional object subject, the display controller 111 displays the optional object CB[k] in the selection-decided period in a mode in which the optional object CB[k] is made more visible than that before the selection-decided period is started. Here, the "displaying an optional object in a mode in which the optional object is made more visible" may be a concept including some or all of the following: making a color of the optional object CB[k] darker; increasing the size of the optional object CB[k]; lowering transparency of the optional object CB[k] (making it opaque); and increasing brightness of the optional object CB[k] (displaying in a brighter color). Conversely, when the optional object CB[k] is not identified as the optional object subject, the display controller 111 displays the optional object CB[k] in the selection-decided period in a mode in which the optional object CB[k] is made less visible than that before the selection-decided period is started. Here, the "displaying an optional object in a mode in which the optional object is made less visible" may be a concept including some or all of the following: making a color of the optional object CB[k] lighter; decreasing the size of the optional object CB[k]; increasing transparency of the optional object CB[k] (making it clear); and lowering brightness of the optional object CB[k] (displaying in a darker color). In the modification, when the selection-decided period is started, the display controller 111 may change either of the following two display modes: an optional object CB that is identified as an optional object subject; and an optional object CB that is not yet identified as an optional object subject.

In the foregoing, in the modification, when the selection-decided period is started, at least one of the following two display modes are changed: an optional object CB that is identified as an optional object subject; and an optional object CB that is not yet identified as the optional object subject. For this reason, according to the modification, the user U wearing the HMD 1 is able to acknowledge with ease the start of the selection-decided period as well as an optional object CB[k] that is about to be selected, as compared to a case in which when the selection-decided period is started, the display mode of the optional object CB[k] is not changed.

Modification 3

In the foregoing embodiment and modifications 1 and 2, the display controller 111 does not change the display mode of an optional object CB[k] that has not been identified as an optional object subject in the period before the selection-decided period is started. However, the present invention is not limited to such an aspect. The display controller 111 may change the display mode of an optional object CB[k] that is not yet identified as an optional object subject in the period before the selection-decided period is started. For example, the display controller 111 may change the display mode of an optional object CB[k] that is not yet identified as an optional object subject at a timing at which the optional object subject is identified at first from among the optional objects CB[1] to CB[K]. In other words, the display controller 111 may differentiate between the display mode of an optional object CB that is not yet identified as an optional object subject in a pre-selection period (an example of a "second period"), and the display mode before the start of the pre-selection period. The pre-selection period is a period from a timing at which an optional object subject is identified at first from among the optional objects CB[1] to CB[K], to the end of the selection-decided period.

Figure 19:
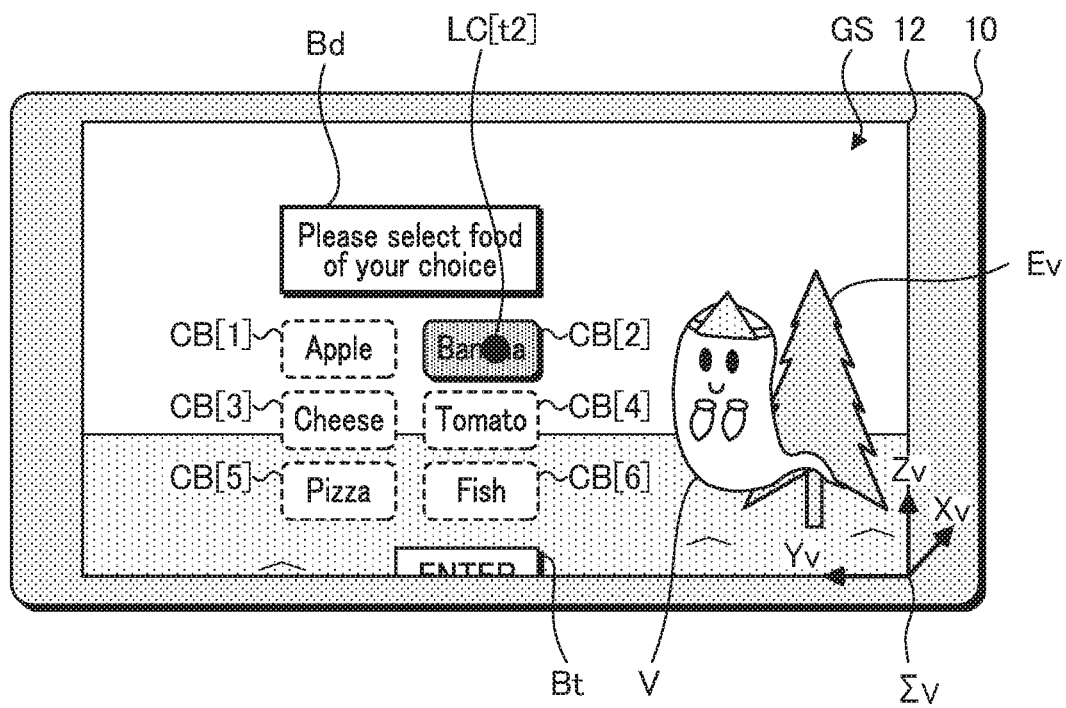
FIG. 19 is an explanatory diagram for an example visible image GS according to modification 3.

FIG. 19 shows an example of a visible image GS according to the modification. In the modification, the display controller 111 causes the display 12 to display a visible image GS, shown in FIG. 7 at time t1. After that, the display controller 111 causes the display 12 to display a visible image GS, shown in FIG. 19 at time t2. As shown in FIG. 19, at time t2 at which an optional object CB[2] is identified as a first optional object subject from among the optional objects CB[1] to CB[6], the display controller 111 changes a display mode of an optional object CB[k], which is other than the optional object CB[2] that is not yet identified as an optional object subject, to a display mode in which the optional object CB[k] is made less visible than that at time t1. According to the modification, the user U wearing the HMD 1 is able to acknowledge with ease an optional object CB that has been identified as an optional object subject.

Modification 4

In the foregoing embodiment and modifications 1 to 3, when a selection condition is satisfied under which a virtual straight line LC continues to intersect with the enter button Bt for the time length $\Delta T1$, the selector 114 selects one or more optional objects CB that are identified as optional object subjects. However, the present invention is not limited to such an aspect. For example, the selector 114 may select one or more optional objects CB that are identified as optional object subjects, when the virtual straight line LC continues to intersect with the optional objects CB for the time length $\Delta T1$. In other words, the selection condition may refer to a condition under which the virtual straight line LC continues to intersect with an optional object CB for the time length $\Delta T1$.

Figure 20:
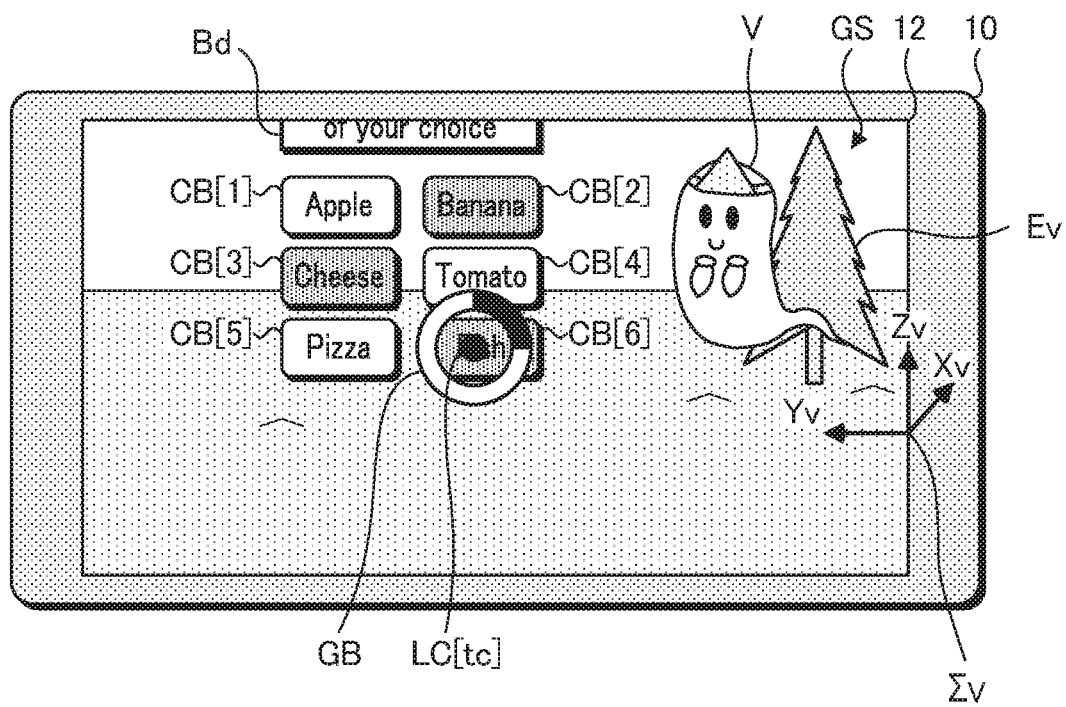
FIG. 20 is an explanatory diagram for an example visible image GS according to modification 4.

FIG. 20 shows an example of a visible image GS according to the modification. In the modification, the display controller 111 causes the display 12 to display visible images GS shown in FIGS. 7 to 9 at times t1 to t4, and after that causes the display 12 to display a visible image GS shown in FIG. 20 at time tc after time t4. Furthermore, in the modification, when the virtual straight line LC continues to intersect with optional objects CB for the time length $\Delta T2$ or longer, as shown in FIG. 20, the display controller 111 causes the display to display the gauge image GB at a position that corresponds to the optional objects CB. The time length $\Delta T2$ is shorter than the time length $\Delta T1$. Then, in the modification, when the virtual straight line LC continues to intersect with optional objects CB for the time length $\Delta T1$, the selector 114 selects one or more optional objects CB that are identified as optional object subjects.

In summary, according to the embodiment, the user U wearing the HMD 1 causes a virtual straight line LC to intersect with an optional object CB, thereby enabling selection of one or more optional objects CB that are identified as optional object subjects. For this reason, according to the modification, when the user U wearing the HMD 1 is about to select optional objects CB, the user U is able to select the optional objects CB in a short time, as compared to, for example, Reference Example 2. Furthermore, according to the modification, the enter button Bt, which is used to select one or more optional objects CB that are identified as optional object subjects in the visible image GS, is not required to display. For this reason, according to the modification, a display of the visible image GS can be simplified, as compared to a mode in which the enter button Bt is displayed in the visible image GS.

In the modification, the selection condition is a condition under which the virtual straight line LC continues to intersect with any optional object CB[k] from among the optional objects CB[1] to CB[K] for the time length ΔT1. However, the present invention is not limited to such an aspect. For example, when M optional objects CB is selected from among the optional objects CB[1] to CB[K] in advance, the selection condition may be a condition under which the virtual straight line LC continues to intersect with an optional object CB that is identified a Mth optional object subject for the time length ΔT1 (M represents a natural number satisfying 1≤M≤K).

Modification 5

In the foregoing embodiment and modifications 1 to 4, the selector 114 selects one or more optional objects CB that are identified as optional object subjects, when a selection condition is satisfied under which a virtual straight line LC intersects with the enter button Bt or the optional objects CB. However, the present invention is not limited to such an aspect. For example, the selector 114 may select one or more optional objects CB that are identified as the optional object subjects, when a predetermined orientation condition (another example of the "predetermined condition") that relates to the orientation information B is satisfied.

In the modification, the selector 114 selects one or more optional objects CB that are identified as the optional object subjects, when a roll rotation state continues for the time length ΔT1 or more. This roll rotation state refers to a state in which the HMD 1 rotates by an angle θth or more from the reference orientation in the roll direction Qx around the Xs-axis. In other words, in the modification, the orientation condition refers to a condition under which the roll rotation state continues for time length ΔT1 or longer. This roll rotation state refers to a state in which an angle, of an amount dB of change in orientation of the HMD 1 from the reference orientation, indicative of the rotation component in the roll direction Qx about the Xs-axis is equal to or greater than the angle θth. In the modification, the Xs-axis is an example of "predetermined reference axis", and the angle θth is an example of "predetermined angle."

Figure 21:
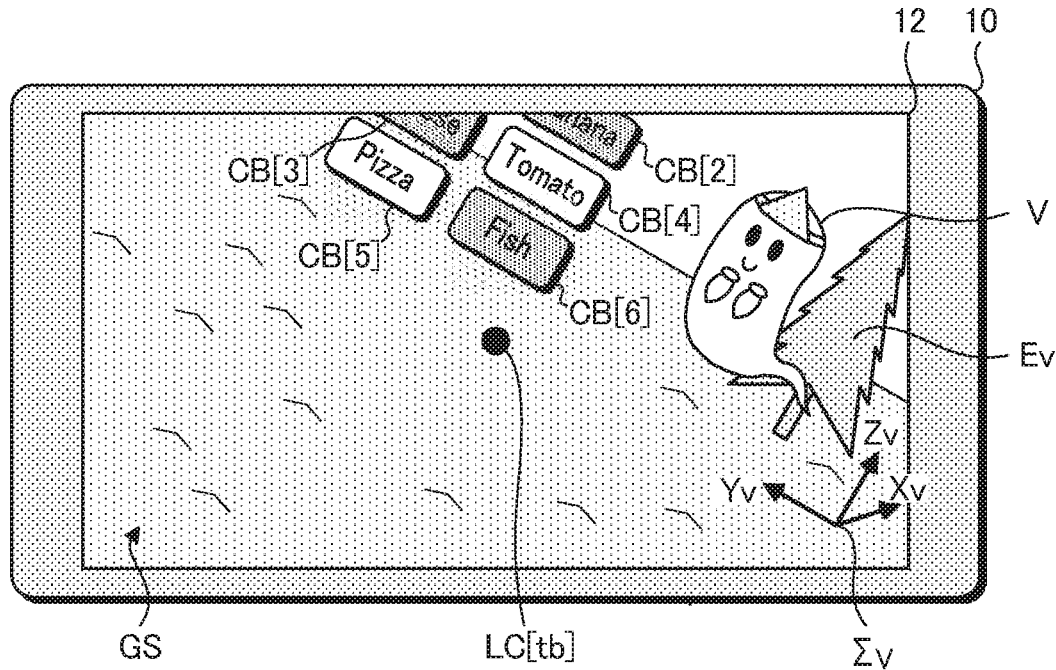
FIG. 21 is an explanatory diagram for an example visible image GS according to modification 5.

FIG. 21 shows an example of a visible image GS according to the modification. In the modification, the display controller 111 causes the display 12 to display visible images GS shown in FIGS. 7 to 9 at times t1 to t4, and after that causes the display 12 to display a visible image GS shown in FIG. 21 in the selection-decided period from time tb1 to time tb5. In the modification, in the selection-decided period, upon the HMD 1 rotates by the angle θth or more from the reference orientation in the roll direction Qx, the camera coordinate system $\Sigma_C$ is also rotated by the angle θth or more from the reference camera coordinate system $\Sigma_{C0}$ in the roll direction QCx. For this reason, in the modification, in the selection-decided period, as shown in FIG. 21, the display controller 111 displays the virtual space SP-V on the display 12 in a mode in which the virtual space SP-V tilted around the Xc axis by an angle θth or more. In other words, in the modification, the user U wearing the HMD1 maintains the state in which the virtual space SP-V is tilted at the angle θth or more around the Xc axis is displayed on the display 12 for the time length ΔT1 or more, thereby enabling selection of one or more optional objects CB that are identified as optional object subjects. In the modification, the enter button Bt may not be provided in the virtual space SP-V. Furthermore, in the modification, in the selection-decided period, the gauge image GB may be displayed in the virtual space SP-V.

In summary, according to the modification, the user U wearing the HMD 1 is able to select one or more objects CB that are identified as optional object subjects by tilting the HMD 1 in the roll direction Qx. For this reason, according to the modification, the user U wearing the HMD 1 is able to select one or more optional objects CB with easy input operation, as compared to Reference Example 2, for example. Furthermore, according to the modification, the enter button Bt, which is used to select one or more optional objects CB that are identified as optional object subjects in the visible image GS, is not required to be displayed. For this reason, according to the modification, a display of the visible image GS can be simplified, as compared to a mode in which the enter button Bt is displayed in the visible image GS.

Modification 6

In the foregoing embodiment and modifications 1 to 4, when a virtual straight line LC and an optional object CB intersect each other, the identifier 113 identifies the optional object CB as an optional object subject. However, the present invention is not limited to such an aspect. For example, even when the virtual straight line LC and the optional object CB intersect each other, and a predetermined specific-avoidable-condition regarding the orientation information B is satisfied, it is not required to identify the optional object CB as the optional object subject.

In the modification, even when the virtual straight line LC and the optional object CB intersect each other, and the HMD 1 is in the roll rotation state in which it rotates by the angle θth or more from the reference orientation in the roll direction Qx around the Xs-axis, the identifier 113 does not identify the optional object CB as the optional object subject. In other words, in the modification, the specific-avoidable-condition refers to a condition under which the HMD 1 is in the roll rotation state. In the modification, the orientation of the HMD 1 in the roll rotation state is an example of "predetermined orientation."

Figure 22:
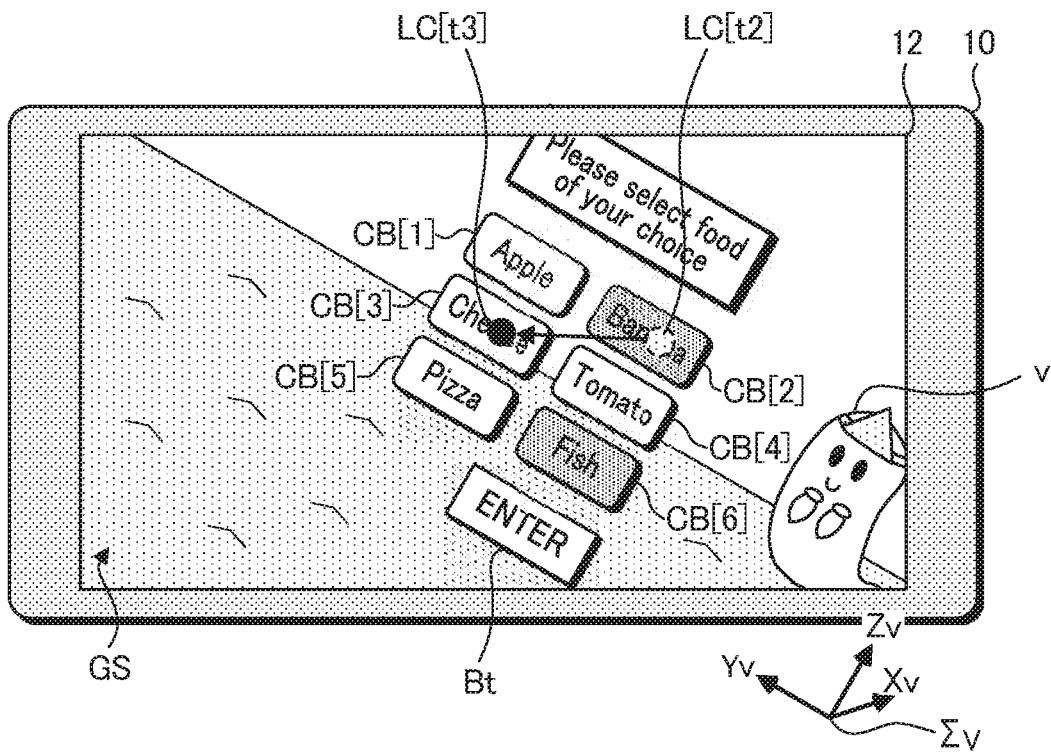
FIG. 22 is an explanatory diagram for an example visible image GS according to modification 6.
Figure 23:
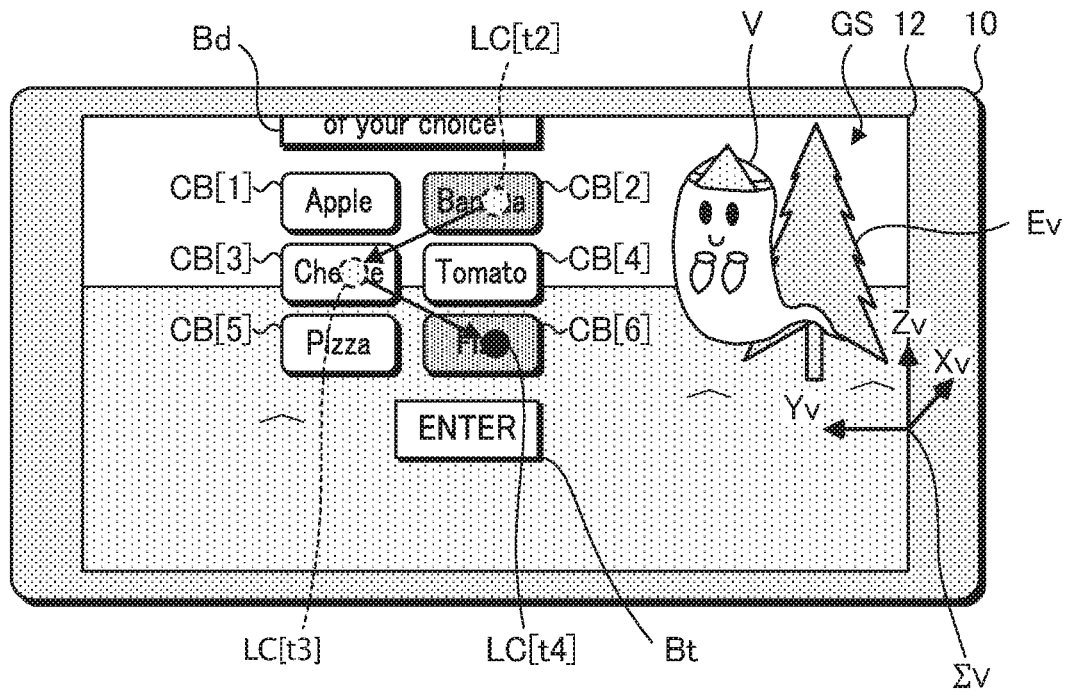
FIG. 23 is an explanatory diagram for an example visible image GS according to modification 6.

FIGS. 22 and 23 each show an example of a visible image GS according to the modification. In the modification, the display controller 111 causes the display 12 to display visible images GS shown in FIGS. 7 to 8 at times t1 to t2, and after that causes the display 12 to display visible images GS shown in FIGS. 22 and 23 at times t3 to t4. As shown in FIG. 22, at time t3, the user U wearing the HMD1 tilts the HMD1 by the angle θth or more in the roll direction QX such that the HMD1 is in the roll rotation state. For this reason, even in which a virtual straight line LC[t3] and an optional object CB[3] intersect each other at time t3, the identifier 113 avoids identification of the optional object CB[3] as the optional object subject. After that, as shown in FIG. 23, at time t4, the user U wearing the HMD 1 is in a state (hereafter, referred to as "non-roll rotation state") in which the HMD1 is tilted by an angle that is less than the angle θth in the roll direction Qx. For this reason, at time t4, the identifier 113 identifies an optional object CB[6] that intersects with a virtual straight line LC[t4] as an optional object subject.

In the foregoing, in the modification, even when a virtual straight line LC and an optional object CB intersect each other, the user U wearing the HMD 1 operates the orientation of the HMD 1 such that the HMD 1 is in the roll rotation state. This allows avoiding identification of the optional object CB as the optional object subject. For this reason, in the modification, for example, even when a plurality of optional objects CB[1] to CB[K] are closely arranged in the virtual space SP-V, it is possible to easily avoid incorrect identification of an optional object CB that is not intended to be selected by the user U wearing the HMD 1, as the optional object subject.

In the modification, when the HMD 1 is in the roll rotation state, the identifier 113 avoids identification of an optional object CB as an optional object subject. However, the present invention is not limited to such an aspect. For example, when the HMD 1 is in the non-roll rotation state, the identifier 113 may avoid identification of the optional object CB as the optional object subject. Conversely, when the HMD 1 is in the roll rotation state, the identifier 113 may identify the optional object CB as the optional object subject.

Modification 7

In the foregoing embodiment and modifications 1 to 5, when a virtual straight line LC and an optional object CB intersect each other, the identifier 113 identifies the optional object CB. However, the present invention is not limited to such an aspect. Only when a trajectory PL of an intersection of a virtual straight line LC with an optional object CB is satisfied with a predetermined trajectory condition, the identifier 113 may identify the optional object CB as an optional object subject. Here, the trajectory condition may be freely selected as long as it is a geometric condition with respect to the trajectory PL.

Figure 24:
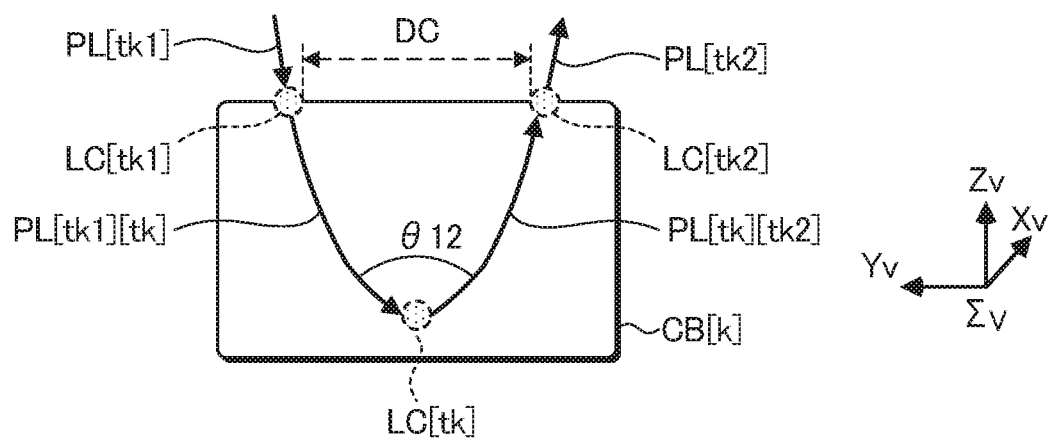
FIG. 24 is an explanatory diagram for an example visible image GS according to modification 7.
Figure 25:
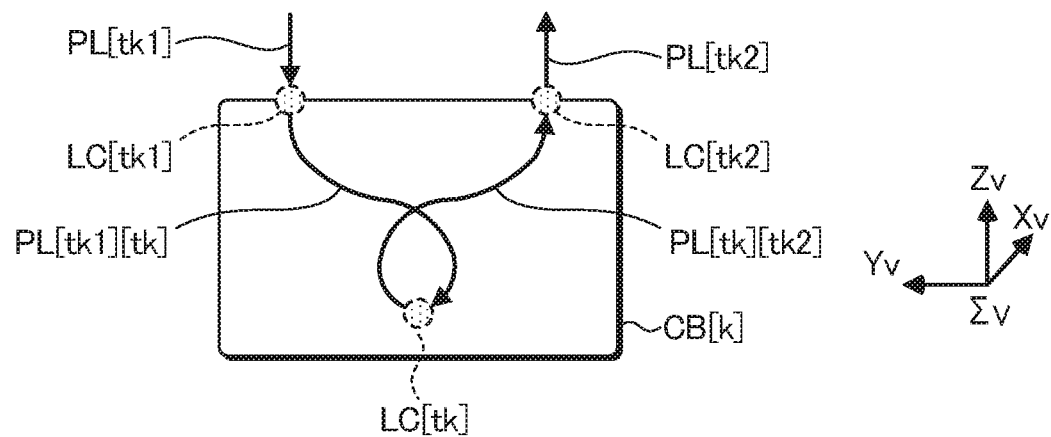
FIG. 25 is an explanatory diagram for an example visible image GS according to modification 7.

FIGS. 24 and 25 are each an explanatory diagram for a trajectory condition. FIGS. 24 and 25 each shows an exemplary case in which an intersection of a virtual straight line LC with an optional object CB[k] starts to be generated at time tk1, and the intersection of the virtual straight line LC with the optional object CB[k] comes to an end at time tk2. In FIGS. 24 and 25, a time between time tk1 and time tk2 is described as time tk. Furthermore, in FIGS. 24 and 25, a trajectory PL[tk1] is denoted by a part of the trajectory PL at predetermined time included in time tk1, a trajectory PL[tk2] is denoted by a part of the trajectory PL at a predetermined time included in time tk2, a trajectory PL[tk1][tk] is denoted by a part of the trajectory PL from time tk1 to time tk, and a trajectory PL[tk][tk2] is denoted by a part of the trajectory PL from time tk to time tk2. The trajectory condition will be will be described below with reference to FIGS. 24 and 25.

In the modification, as shown in FIG. 24, the trajectory condition may refer to a condition under which an angle θ12 is less than or equal to a predetermined reference angle (e.g., 90 degrees), for example. The angle θ12 refers to an angle between a unit vector representative of a direction in which the trajectory PL[tk] changes and a unit vector representative of a direction opposite to a direction in which the trajectory PL[tk2] changes. Alternatively, in the modification, as shown in FIG. 24, the trajectory condition may refer to a condition under which a distance DC between the virtual straight line LC[tk1] at time tk1 and the virtual straight line LC[tk2] at time tk2 is less than or equal to a predetermined reference distance, for example. Alternatively, in the modification, as shown in FIG. 24, the trajectory condition may refer to a condition under which the following (b-i) and (b-ii) are positioned on the same side, e.g., on the +Zv side, of sides constituting the optional object CB: (b-i) an intersection of the virtual straight line LC[tk1] with the optional object CB[k] at the time tk1; and (b-ii) an intersection of the virtual straight line LC[tk2] with the optional object CB[k] at the time tk2, for example. Alternatively, in the modification, as shown in FIG. 25, the trajectory condition may refer to a condition under which the trajectory PL[tk1][tk] and the trajectory PL[tk][tk2] intersect each other.

In summary, according to the modification, only when a trajectory PL of an intersection of a virtual straight line LC with an optional object CB is satisfied with the predetermined trajectory condition, the optional object CB is identified as an optional object subject. For this reason, according to the modification, it is possible to reduce the probability of incorrect selection of the optional object CB, as compared to a case in which an optional object CB is identified at a time at which the optional object CB intersects with the virtual straight line LC, for example.

Modification 8

In the foregoing embodiment and modifications 1 to 7, the orientation information B indicates a detection result of a change in orientation of the terminal apparatus 10. However, the present invention is not limited to such an aspect. The orientation information B may indicates orientation of the terminal apparatus 10 viewed by a coordinate system fixed on the ground, for example. In this case, the orientation information generator 14 may include either an acceleration sensor or a geomagnetic sensoror, or may include both, for example. Alternatively, in this case, the orientation information B may refer to information on an image output from a camera that is provided outside of the HMD 1 and captures the HMD 1, for example.

Modification 9

In the foregoing embodiment and modifications 1 to 8, the information processing apparatus is provide in the HMD 1. However, the information processing apparatus may be provided separately from the HMD 1.

Figure 26:
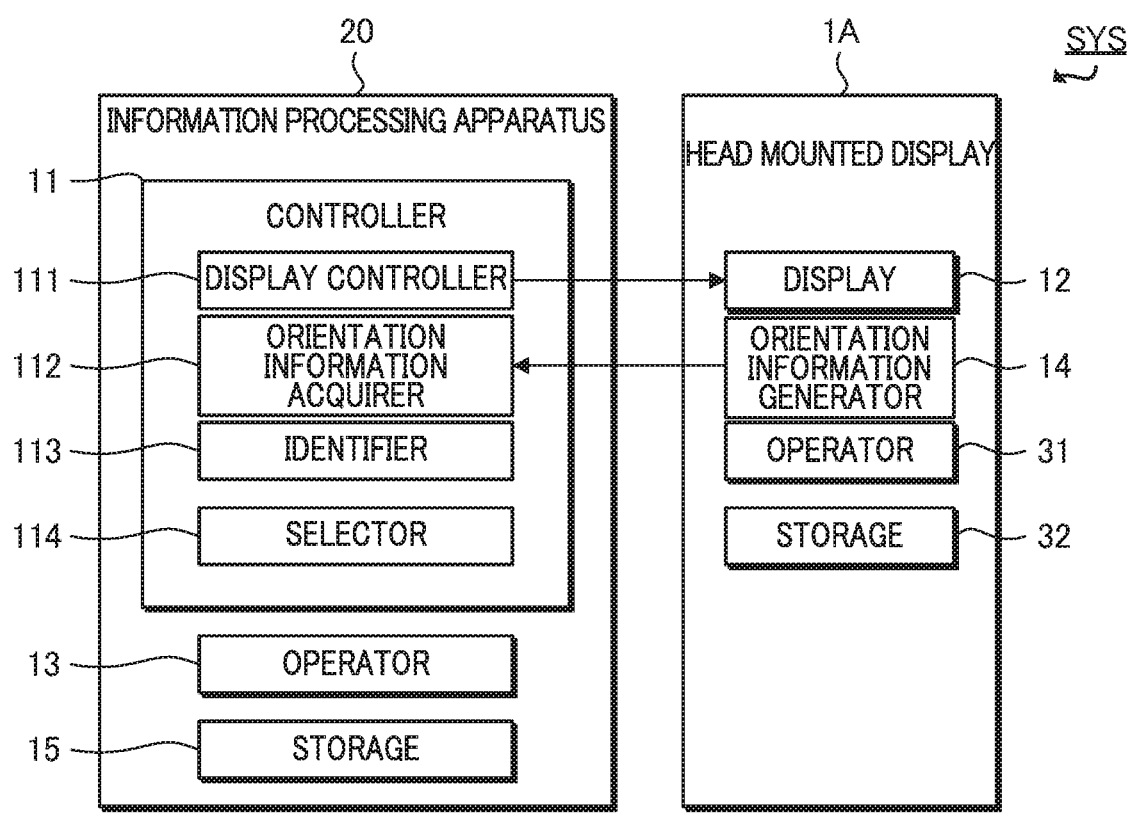
FIG. 26 is an example block diagram for the configuration of an information processing system SYS according to modification 9.

FIG. 26 is a block diagram for an example configuration of an information processing system SYS according to the modification. As shown in FIG. 26, the information processing system SYS includes an information processing apparatus 20 and a Head Mounted Display 1A that is communicable with the information processing apparatus 20. Among these components, the information processing apparatus 20 may include, for example, the controller 11, the operator 13, and the storage 15. The Head Mounted Display A may include, in addition to the display 12 and the orientation information generator 14, an operator 31 that receives an input operation carried out by the user U wearing the Head Mounted Display 1A, and a storage 32 that stores thereon various information.

Modification 10

In the foregoing embodiment and modifications 1 to 9, the virtual straight line LC represents the optical axis of the virtual camera CM. However, the present invention is not limited to such an aspect. For example, when the HMD 1 has an eye tracking feature of measuring a direction of the line of sight of the user U wearing it, the line of sight measured by the eye tracking feature may be used as the virtual straight line LC.

C. Appendixes

From the above description, the present invention can be understood, for example, as follows. In order to clarify each aspect, reference numerals in the drawings are appended below in parentheses for convenience. However the present invention is not limited to the drawings.

Appendix 1

A recording medium according to an aspect of the present invention is a non-transitory computer readable recording medium (e.g., a memory 1001) having recorded therein a program (e.g., control program PRG), the program causing a processor (e.g., a processor 1000) of an information processing apparatus (e.g., a terminal apparatus 10) to function as: a display controller (e.g., a display controller 111) configured to cause a display (e.g., a display 12) provided on a Head Mounted Display (e.g., HMD) to display a stereoscopic image to which binocular parallax is applied, the stereoscopic image being an image of a virtual space (e.g., a virtual space SP-V) in which optional objects (e.g., optional objects CB) are disposed, and the virtual space being captured by a virtual camera (e.g., a virtual camera); an acquirer (e.g., an orientation information acquirer 112) configured to acquire orientation information (e.g., orientation information) on an orientation of the Head Mounted Display; an identifier (an identifier 113) configured to, when a predetermined position relationship (e.g., a relationship of an intersection) is established between a virtual line (e.g., virtual straight line LC) and one optional object from among the optional objects, the virtual line having a direction according to the orientation information and intersecting with the virtual camera, identify the one option image; and a selector (e.g., a selector 114) configured to, when one or more optional objects are identified by the identifier and a predetermined condition (e.g., a selection condition) relating to the orientation information is satisfied, select the one or more optional objects.

According to the aspect, when the predetermined positional relationship is established between an optional object and a virtual line having a direction according to the orientation information, the optional object is identified. Then, according to the aspect, when one or more optional objects are identified, and the predetermined condition relating to the orientation information is satisfied, the identified one or more optional objects are selected. In other words, according to the aspect, identification of the optional objects and selection of the identified optional objects are carried out on the bases of the orientation information relating to the orientation of the Head Mounted Display. For this reason, according to the aspect, the user wearing the Head Mounted Display is able to select one or more optional objects, based on the orientation of the Head Mounted Display. For this reason, according to the aspect, on the bases of the orientation information, it is possible to carry out both of the following: an input operation to change the orientation of the virtual camera; and an input operation other than the input operation to change the orientation of the virtual camera. In other words, according to the aspect, it is possible to input various instructions by changing the orientation of Head Mounted Display.

Now, a case (hereafter, as referred to "Reference Example 1") is assumed as follows: when the predetermined positional relationship is established between a virtual line and one optional object from among optional objects, the virtual line having a direction according to the orientation information, the one optional object is selected. However, in the Reference Example 1, when an appropriate input operation relating to the orientation of the Head Mounted Display is not carried out, incorrect selection of an optional object that differs from the desired optional object may be carried out. Conversely, according to the aspect, when the desired optional object is identified, the optional object is selected. For this reason, according to the aspect, probability of incorrect selection of an optional object that differs from the desired optional object is reduced, as compared to the Reference Example 1.

In order to avoid incorrect selection of an optional object that differs from the desired optional object, another case (hereafter, as referred to "Reference Example 2") is assumed as follows: when the predetermined positional relationship is maintained between the virtual line and the one optional object for the predetermined time length, the one optional object is selected. However, in Reference Example 2, as the number of the optional objects to be selected increases, time required for selection increases and whereby a burden on the user wearing the Head Mounted Display increases. Conversely, according to the aspect, even when two or more optional objects are selected from among the optional objects, the user wearing the Head Mounted Display changes the orientation of the Head Mounted Display such that the predetermined positional relationship is established between the virtual line and each of the two or more optional objects, and after that changes the orientation of the Head Mounted Display such that the predetermined condition is satisfied, thereby enabling selection of the two or more optional objects. For this reason, according to the aspect, prolongation of time required for selection is reduced when the number of the optional objects to be selected is greater, as compared to Reference Example 2. For this reason, according to the aspect, even when the number of the optional objects to be selected is greater, a burden on the user wearing the Head Mounted Display is reduced, as compared to Reference Example 2.

In the above aspect, the "optional object" may be a virtual object that exists in the virtual space or may be a specific region that exists in the virtual space, for example. In the case in which the "optional object" may be a specific region that exists in the virtual space, the region may be a region that is separated from the surroundings thereof by color or pattern. Here, the "specific region that exists in the virtual space" may be one having one dimensional spread in the virtual space, such as a straight line, a curve and a line segment, may be one having two dimensional spread in the virtual space, such as a square, a triangle and a circle, or may be one having three dimensional spread in the virtual space, such as a solid and a curved-surface solid. The "optional objects" may be regions that are provided on a surface of a display object that is disposed in the virtual space.

In the above aspect, the "virtual camera" may include a first virtual camera that captures an image of the virtual space and a second virtual camera that captures an image of the virtual space at a position that differs from that of the first virtual camera, for example. The "stereoscopic image" may include the following: an image for left eye, which is an image of the virtual space captured by the first virtual camera and is viewed by the user's left eye; and an image for right eye, which is an image of the virtual space captured by the second virtual camera and is viewed by the user's right eye, for example.

In the above aspect, the "Head Mounted Display" may be a display apparatus that is wearable on the user's head, for example. Specifically, the "Head Mounted Display" may be a goggle-type or eyeglass-type display apparatus that is wearable on the user's head. The "Head Mounted Display" may include wearable equipment that is wearable on the user's head, and a portable display apparatus, such as a smartphone, that is mounted on the wearable equipment.

In the above aspect, the "orientation of the Head Mounted Display" may be a direction of the Head Mounted Display, or may be an inclination of the Head Mounted Display, or may be a concept including both the orientation and the inclination of the Head Mounted Display, for example. Here, the "direction of the Head Mounted Display" may be a direction in which the Head Mounted Display orientates in the real space, or may be an angle between the reference direction of the Head Mounted Display and a direction of the magnetic north, for example. The "inclination of the Head Mounted Display" may be an angle between the reference direction of the Head Mounted Display and the vertical direction, for example.

In the above aspect, the "orientation information" may indicate the orientation of the Head Mounted Display or may indicate a change in orientation of the Head Mounted Display, for example.

In the above aspect, the "acquirer" may acquire the orientation information from the Head Mounted Display, or may acquire the orientation information from an imaging apparatus that captures an image of the Head Mounted Display. When the acquirer acquires the orientation information from the Head Mounted Display, the Head Mounted Display may include a sensor for detecting information indicative of a change in orientation of the Head Mounted Display, or may include a sensor for detecting information indicative of the orientation of the Head Mounted Display. Here, the "sensor for detecting information indicative of a change in orientation of the Head Mounted Display" may be an angular velocity sensor, for example. Alternatively, the "sensor for detecting information indicative of the orientation of the Head Mounted Display" may be one or both a geomagnetic sensor and an angular velocity sensor. When the acquirer acquires the orientation information from an imaging apparatus that captures an image of the Head Mounted Display, the orientation information may be an image indicating a result of an image of the Head Mounted Display captured by the imaging apparatus.

In the above aspect, the "virtual line" may be a straight line that extends in the direction in which the virtual camera orientates in the virtual space, for example. Specifically, the "virtual line" may be the optical axis of the virtual camera, for example. Alternatively, the "vertical line" may be a straight line that extends in a sight direction of the user wearing the Head Mounted Display, for example. In this case, the Head Mounted Display may have an eye tracking feature that detects a sight direction of the user wearing it.

In the above aspect, the "predetermined positional relationship is established between the virtual line and the optional object" may refer to a case in which the virtual line and the optional object intersect each other, for example. Alternatively, the "predetermined positional relationship is established between the virtual line and the optional object" may refer to a case in which a distance between the virtual line and the optional object is less than or equal to a predetermined distance, for example.

In the above aspect, the "predetermined condition" may be a condition relating to a virtual line having a direction according to the orientation information, may be a condition relating to an orientation of the Head Mounted Display indicative of the orientation information, or may be a condition relating to a change in orientation of the Head Mounted Display indicative of the orientation information. Here, the "condition relating to a virtual line having a direction according to the orientation information" may be a condition under which a predetermined positional relationships is established between a virtual line having a direction according to the orientation information and a predetermined object that is disposed in the virtual space, the predetermined object being a virtual object, for example. Alternatively, the "condition relating to a virtual line having a direction according to the orientation information" may be a condition under which the predetermined positional relationship is maintained between a virtual line having a direction according to the orientation information and the predetermined object that is disposed in the virtual space, the predetermined object being a virtual object, in a first period having the predetermined time length, for example. Alternatively, the "condition relating to a virtual line having a direction according to the orientation information" may be a condition under which the predetermined positional relationship is maintained between the virtual line having a direction according to the orientation information and one optional object that has been identified by the identifier, in a first period having the predetermined time length, for example. The "condition relating to an orientation of the Head Mounted Display indicative of the orientation information" may be a condition under which the orientation of the Head Mounted Display indicative of the orientation information is an orientation in which the Head Mounted Display rotates by the predetermined angle or more from a reference orientation around the predetermined reference axis, for example. Alternatively, the "condition relating to an orientation of the Head Mounted Display indicative of the orientation information" may be a condition under which the orientation of the Head Mounted Display indicative of the orientation information rotates by the predetermined angle or more around the predetermined reference axis, for example.

Appendix 2

The recording medium according to another aspect of the present invention is a recording medium according to Appendix 1, when the predetermined positional relationship is established between the virtual line and a predetermined object (e.g., an enter button) that is disposed in the virtual space, the selector is configured to select the one or more optional objects.

According to the aspect, in which the predetermined positional relationship is established between the virtual line and the predetermined object, the optional object identified by the identifier is selected. For this reason, according to the aspect, probability of incorrect selection of an optional object that differs from the optional object to be selected is reduced, as compared to the Reference Example 1. Furthermore, according to the aspect, even when two or more optional objects are selected from among the optional objects, the user wearing the Head Mounted Display changes the orientation of the Head Mounted Display such that the predetermined positional relationship is established between the virtual line and each of the two or more optional objects, and after that the user changes the orientation of the Head Mounted Display such that the predetermined positional relationship is established between the virtual line and the predetermined object, and thereby enabling selection of the two or more optional objects. For this reason, according to the aspect, prolongation of time required for selection is reduced when the number of the optional objects to be selected is greater, as compared to Reference Example 2.

In the above aspect, the "predetermined object" may be a virtual object that exists in the virtual space or may be a specific region that exists in the virtual space, for example.

Appendix 3

The recording medium according to another aspect of the present invention is a recording medium according to Appendix 1, when the orientation of the Head Mounted Display indicated by the orientation information is an orientation in which the Head Mounted Display rotates by a predetermined angle (e.g., an angle θth) or more from a reference orientation (e.g., an orientation of HMD 1 at the reference time t0) around a predetermined reference axis (e.g., the $X_S$-axis), the selector is configured to select the one or more optional objects.

According to the aspect, when the orientation of the Head Mounted Display rotates by the predetermined angle or more around the predetermined reference axis, the optional object that has been identified by the identifier is selected. For this reason, according to the aspect, probability of incorrect selection of an optional object that differs from the optional object to be selected is reduced, as compared to the Reference Example 1. Furthermore, according to the aspect, even when two or more optional objects are selected from among the optional objects, the user wearing the Head Mounted Display changes the orientation of the Head Mounted Display such that the predetermined positional relationship is established between the virtual line and each of the two or more optional objects, and after that the user changes the orientation of the Head Mounted Display such that the Head Mounted Display rotates by the predetermined angle or more around the predetermined reference axis, and thereby enabling selection of the two or more optional objects. For this reason, according to the aspect, prolongation of time required for selection is reduced when the number of the optional objects to be selected is greater, as compared to Reference Example 2.

In the above aspect, the "predetermined reference axis" may be a straight line that extends to the predetermined direction when viewed by the user wearing the Head Mounted Display, for example. Specifically, the "predetermined reference axis" may be, when viewed by the user wearing the Head Mounted Display, a straight line that extends a direction in front of the user, for example. In other words, in the above aspect, the "orientation in which the Head Mounted Display rotates by the predetermined angle or more from the predetermined reference orientation around the predetermined reference axis" may be an orientation in which the Head Mounted Display rotates by the predetermined angle or more in the roll direction, when viewed by the user wearing the Head Mounted Display, for example.

Appendix 4

The recording medium according to another aspect of the present invention is a recording medium according to Appendix 1, when for a first period, the predetermined positional relationship is maintained between the virtual line and a predetermined object that is disposed in the virtual space, the selector is configured to select the one or more optional objects.

According to the aspect, when for the first period, the predetermined positional relationship is maintained between the virtual line and the predetermined object, the optional object that has been identified by the identifier is selected. For this reason, according to the aspect, probability of incorrect selection of an optional object that differs from the optional object to be selected is reduced, as compared to the Reference Example 1. Furthermore, according to the aspect, even when two or more optional objects are selected from among the optional objects, the user wearing the Head Mounted Display changes the orientation of the Head Mounted Display such that the predetermined positional relationship is established between the virtual line and each of the two or more optional objects, and after that the user controls the orientation of the Head Mounted Display such that for the first period, the predetermined positional relationship is established between the virtual line and the predetermined object, thereby enabling selection of the two or more optional objects. For this reason, according to the aspect, prolongation of time required for selection is reduced when the number of the optional objects to be selected is greater, as compared to Reference Example 2.

In the above aspect, the "first period" may have the predetermined time length, and may be started at time at which the predetermined positional relationship is established between the virtual line and the predetermined object, for example.

Appendix 5

The recording medium according to another aspect of the present invention is a recording medium according to Appendix 1, when for a first period (e.g., a selection-decided period), the predetermined positional relationship is maintained between the virtual line and the one optional object, the selector is configured to select the one or more optional objects.

According to the aspect, when for the first period, the predetermined positional relationship is maintained between the virtual line and one optional object, the optional object that has been identified by the identifier is selected. For this reason, according to the aspect, probability of incorrect selection of an optional object that differs from the optional object to be selected is reduced, as compared to the Reference Example 1. Furthermore, according to the aspect, even when two or more optional objects are selected from among the optional objects, the user wearing the Head Mounted Display changes the orientation of the Head Mounted Display such that the predetermined positional relationship is established between the virtual line and each of the two or more optional objects, and after that the user controls the orientation of the Head Mounted Display such that for the first period, the predetermined positional relationship is established between the virtual line and one optional object from among two or more optional objects, and thereby enabling selection of the two or more optional objects. For this reason, according to the aspect, prolongation of time required for selection is reduced when the number of the optional objects to be selected is greater, as compared to Reference Example 2.

In the above aspect, the "first period" may have the predetermined time length, and may be started at time at which the predetermined positional relationship is established between the virtual line and the one optional object, for example.

Appendix 6

The recording medium according to another aspect of the present invention is a recording medium according to Appendixes 1 or 5, upon a condition under which M (the M represents a natural number that is equal to or greater than one) optional objects are to be selected from among the optional objects, when for a first period, the predetermined positional relationship is maintained between the virtual line and an optional object that is identified by the identifier at the Mth time from among the optional objects, the selector is configured to select the M optional objects identified by the identifier.

According to the aspect, when for the first period, the predetermined positional relationship is maintained between the virtual line and an optional object that is identified by the identifier at the Mth time, the optional object that has been identified by the identifier is selected. For this reason, according to the aspect, probability of incorrect selection of an optional object that differs from the optional object to be selected is reduced, as compared to the Reference Example 1. Furthermore, according to the aspect, even when two or more optional objects are selected from among the optional objects, the user wearing the Head Mounted Display changes the orientation of the Head Mounted Display such that the predetermined positional relationship is established between the virtual line and each of the two or more optional objects, and after that the user controls the orientation of the Head Mounted Display such that for the first period, the predetermined positional relationship is established between the virtual line and the optional object that has been identified at the last (the Mth time) from among two or more optional objects, and thereby enabling selection of the two or more optional objects. For this reason, according to the aspect, prolongation of time required for selection is reduced when the number of the optional objects to be selected is greater, as compared to Reference Example 2.

In the above aspect, the "first period" may have the predetermined time length, and may be started at time at which the predetermined positional relationship is established between the virtual line and the optional object that is identified at the Mth time, for example.

Appendix 7

The recording medium according to another aspect of the present invention is a recording medium according to any one of Appendixes 4 to 6, when the predetermined positional relationship is established between the virtual line and the one optional object, or when for a reference period (e.g., a time length ΔT2) having a time length that is shorter than that of the first period, the predetermined positional relationship is maintained between the virtual line and the one optional object, the selector is configured to select the one optional object.

According to the aspect, in the reference period having the time length that is shorter than that of the first period, when the predetermined positional relationship is established between a virtual line and an optional object, the optional object is identified. For this reason, according to the aspect, time required to identify an optional object is made shorter, as compared to an aspect in which when the predetermined positional relationship is maintained between a virtual line and an optional object for the first period, the optional object is identified, for example.

Appendix 8

The recording medium according to another aspect of the present invention is a recording medium according to any one of Appendixes 1 to 7, when the predetermined positional relationship is established between the virtual line and the one optional object, and the orientation of the Head Mounted Display indicated by the orientation information is a predetermined orientation (e.g., an orientation in the roll rotation state), the identifier is configured to identify the one optional object, and when the predetermined positional relationship is established between the virtual line and the one optional object, and the orientation of the Head Mounted Display indicated by the orientation information is not the predetermined orientation, the identifier is configured not to identify the one optional object.

According to the aspect, only when the orientation of the Head Mounted Display is the predetermined orientation, the optional object is identified. For this reason, according to the aspect, it is possible to reduce probability of incorrect selection of an optional object that differs from the desired optional object, as compared to an aspect in which an optional object is identified only on the basis of the positional relationship between the virtual line and the optional object with no consideration of the orientation of the Head Mounted Display, for example.

In the above aspect, the "only when the orientation of the Head Mounted Display is the predetermined orientation" may refer to a case in which the Head Mounted Display is in an orientation in which it rotates by the predetermined angle or more from the reference orientation around the predetermined reference axis, for example. Conversely, the "only when the orientation of the Head Mounted Display is the predetermined orientation" may refer to a case in which the Head Mounted Display is in an orientation in which it rotates by less than the predetermined angle from the reference orientation around the predetermined reference axis, for example.

Appendix 9

The recording medium according to another aspect of the present invention is a recording medium according to any one of Appendixes 1 to 8, the display controller is configured to differentiate between: a display mode, in the display, of another optional object that is not yet identified by the identifier from among the optional objects in a second period (e.g., a pre-selection period); and a display mode, in the display, of the another optional object before a start of the second period, the second period being a period after an optional object is identified for the first time by the identifier from among the optional objects until the one or more optional objects are selected by the selector.

According to the aspect, a display mode of another optional object in the second period is differentiated from a display mode of the other optional object in the period before the start of the second period. For this reason, according to the aspect, the user wearing the Head Mounted Display is able to view with ease which optional object being identified from among the optional objects, as compared to a case in which a display mode of another optional object in the second period is the same as that in the period before the start of the second period, for example.

In the above aspect, the "display mode" refers to, for example, a mode that is distinguished from another mode with the sense of sight. Specifically, the "display mode" may be a concept including some or all of shape, pattern, color, size, brightness, and transparency, for example.

Appendix 10

The recording medium according to another aspect of the present invention is a recording medium according to any one of Appendixes 1 to 9, the display controller is configured to differentiate between: a display mode, in the display, of the one optional object after the one optional object is identified by the identifier; and a display mode, in the display, of the one optional object that is not yet identified by the identifier.

According to the aspect, a display mode of one optional object in a period after the one optional object has been identified is differentiated from a display mode of one optional object in a period before the one optional object is identified. For this reason, according to the aspect, the user wearing the Head Mounted Display is able to view with ease which optional object being identified from among the optional objects, as compared to a case in which a display mode of one optional object in a period after the one optional object has been identified is the same as that in a period before the one optional object, for example.

Appendix 11

The recording medium according to another aspect of the present invention is a recording medium according to any one of Appendixes 4 to 7, the display controller is configured to differentiate between: a display mode, in the display, of at least some optional objects from among the optional objects in a period before a start of the first period; and a display mode, in the display, of the at least some optional objects in a period of a part or entire of the first period.

According to the aspect, a display mode of some optional objects in the first period is differentiated from a display mode of the some optional objects in the period before the start of the first period. For this reason, according to the aspect, the user wearing the Head Mounted Display is able to acknowledge the start of the first period in which optional objects are selected, as compared to a case in which a display mode of some optional objects in the first period is the same as that in the period before the start of the first period, for example.

In the above aspect, the "at least some optional objects" may be one optional object that is identified by the identifier from among optional objects, may be another optional object that is not yet identified by the identifier from among the optional objects, or may include both the one object and the other object, for example.

Appendix 12

An information processing apparatus according to an aspect of the present invention includes: a display controller configured to cause a display provided on a Head Mounted Display to display a stereoscopic image to which binocular parallax is applied, the stereoscopic image being an image of a virtual space in which optional objects are disposed, and the virtual space being captured by a virtual camera; an acquirer configured to acquire orientation information on an orientation of the Head Mounted Display; an identifier configured to, when a predetermined position relationship is established between a virtual line and one optional object from among the optional objects, the virtual line having a direction according to the orientation information and intersecting with the virtual camera, identify the one option image; and a selector configured to, when one or more optional objects are identified by the identifier and a predetermined condition relating to the orientation information is satisfied, select the one or more optional objects.

According to the aspect, identification of the optional objects and selection of the identified optional objects are carried out on the bases of the orientation information relating to the orientation of the Head Mounted Display. For this reason, according to the aspect, the user wearing the Head Mounted Display is able to carry out an input operation other than an input operation to change the orientation of the virtual camera on the bases of the orientation of the Head Mounted Display. In other words, according to the aspect, it is possible to input various instructions by changing the orientation of Head Mounted Display. Furthermore, according to the aspect, when the desired optional object is identified, the optional object is selected. For this reason, according to the aspect, probability of incorrect selection of an optional object that differs from the desired optional object is reduced, as compared to the Reference Example 1. Furthermore, according to the aspect, even when two or more optional objects are selected from among the optional objects, it is possible to select the two or more options by changing the orientation of the Head Mounted Display. For this reason, according to the aspect, prolongation of time required for selection is reduced when the number of the optional objects to be selected is greater, as compared to Reference Example 2.

Appendix 13

A Head Mounted Display according to an aspect of the present invention includes: a display; and an information processing apparatus, in which the information processing apparatus includes: a display controller configured to cause a display provided on a Head Mounted Display to display a stereoscopic image to which binocular parallax is applied, the stereoscopic image being an image of a virtual space in which optional objects are disposed, and the virtual space being captured by a virtual camera; an acquirer configured to acquire orientation information on an orientation of the Head Mounted Display; an identifier configured to, when a predetermined position relationship is established between a virtual line and one optional object from among the optional objects, the virtual line having a direction according to the orientation information and intersecting with the virtual camera, identify the one option image; and a selector configured to, when one or more optional objects are identified by the identifier and a predetermined condition relating to the orientation information is satisfied, select the one or more optional objects.

According to the aspect, identification of the optional objects and selection of the identified optional objects are carried out on the bases of the orientation information relating to the orientation of the Head Mounted Display. For this reason, according to the aspect, the user wearing the Head Mounted Display is able to carry out an input operation other than an input operation to change the orientation of the virtual camera on the bases of the orientation of the Head Mounted Display. In other words, according to the aspect, it is possible to input various instructions by changing the orientation of Head Mounted Display. Furthermore, according to the aspect, when the desired optional object is identified, the optional object is selected. For this reason, according to the aspect, a possibility of incorrect selection of an optional object that differs from the desired optional object is reduced, as compared to the Reference Example 1. Furthermore, according to the aspect, even when two or more optional objects are selected from among the optional objects, it is possible to select the two or more options by changing the orientation of the Head Mounted Display. For this reason, according to the aspect, prolongation of time required for selection is reduced when the number of the optional objects to be selected is greater, as compared to Reference Example 2.

Appendix 14

An information processing system according to an aspect of the present invention includes: a Head Mounted Display including a display; and an information processing apparatus, in which the information apparatus includes: a display controller configured to cause a display provided on a Head Mounted Display to display a stereoscopic image to which binocular parallax is applied, the stereoscopic image being an image of a virtual space in which optional objects are disposed, and the virtual space being captured by a virtual camera; an acquirer configured to acquire orientation information on an orientation of the Head Mounted Display; an identifier configured to, when a predetermined position relationship is established between a virtual line and one optional object from among the optional objects, the virtual line having a direction according to the orientation information and intersecting with the virtual camera, identify the one option image; and a selector configured to, when one or more optional objects are identified by the identifier and a predetermined condition relating to the orientation information is satisfied, select the one or more optional objects.

According to the aspect, identification of the optional objects and selection of the identified optional objects are carried out on the bases of the orientation information relating to the orientation of the Head Mounted Display. For this reason, according to the aspect, the user wearing the Head Mounted Display is able to carry out an input operation other than an input operation to change the orientation of the virtual camera on the bases of the orientation of the Head Mounted Display. In other words, according to the aspect, it is possible to input various instructions by changing the orientation of Head Mounted Display. Furthermore, according to the aspect, when the desired optional object is identified, the optional object is selected. For this reason, according to the aspect, a possibility of incorrect selection of an optional object that differs from the desired optional object is reduced, as compared to the Reference Example 1. Furthermore, according to the aspect, even when two or more optional objects are selected from among the optional objects, it is possible to select the two or more options by changing the orientation of the Head Mounted Display. For this reason, according to the aspect, prolongation of time required for selection is reduced when the number of the optional objects to be selected is greater, as compared to Reference Example 2.

DESCRIPTION OF REFERENCE SIGNS

1 . . . Head Mounted Display
10 . . . terminal apparatus
11 . . . controller
12 . . . display
13 . . . operator
14 . . . orientation information generator
15 . . . storage
111 . . . display controller
112 . . . orientation information acquirer
113 . . . identifier
114 . . . selector
1000 . . . processor
1002 . . . angular velocity sensor

What is claimed is:

1. A non-transitory computer readable recording medium having recorded therein a program that is executed by a processor of an information processing apparatus, the program causes the processor to:

cause a display provided on a Head Mounted Display to display a stereoscopic image to which binocular parallax is applied, the stereoscopic image being an image of a virtual space in which optional objects are disposed, and the virtual space being captured by a virtual camera;

acquire orientation information on an orientation of the Head Mounted Display;

identify a first optional object based on a predetermined position relationship being established between a virtual line and a first optional object from among the optional objects, the virtual line having a direction according to the orientation information and intersecting with a virtual straight line extending along an optical axis of the virtual camera;

identify a second optional object based on a predetermined position relationship being established between the virtual line and a second optional object from among the optional objects; and based on a predetermined condition relating to the orientation information being satisfied,
select the identified first and second optional objects.

2. The recording medium according to claim 1, wherein:
when the predetermined positional relationship is established between the virtual line and a predetermined object that is disposed in the virtual space,
the program causes the processor to select the identified first and second optional objects.

3. The recording medium according to claim 1, wherein:
when the orientation of the Head Mounted Display indicated by the orientation information is an orientation in which the Head Mounted Display rotates by a predetermined angle or more from a reference orientation around a predetermined reference axis,
the program causes the processor to select the identified first and second optional objects.

4. The recording medium according to claim 1, wherein:
when for a first period, the predetermined positional relationship is maintained between the virtual line and a predetermined object that is disposed in the virtual space,
the program causes the processor to select the identified first and second optional objects.

5. The recording medium according to claim 1, wherein:
when for a first period, the predetermined positional relationship is maintained between the virtual line and the one optional object,
the program causes the processor to select the identified first and second optional objects.

6. The recording medium according to claim 1, wherein:
upon a condition under which M (the M represents a natural number that is equal to or greater than one) optional objects are to be selected from among the optional objects, when for a first period, the predetermined positional relationship is maintained between the virtual line and an optional object that is identified at the Mth time from among the optional objects, the program causes the processor to select the identified M optional objects.

7. The recording medium according to claim 4, wherein:
when the predetermined positional relationship is established between the virtual line and the first optional object, or
when for a reference period having a time length that is shorter than that of the first period, the predetermined positional relationship is maintained between the virtual line and the first optional object, the program causes the processor to select the first optional object.

8. The recording medium according to claim 1, wherein:
when the predetermined positional relationship is established between the virtual line and the first optional object, and the orientation of the Head Mounted Display indicated by the orientation information is a predetermined orientation, the program causes the processor to identify the first optional object, and when the predetermined positional relationship is established between the virtual line and the first optional object, and the orientation of the Head Mounted Display indicated by the orientation information is not the predetermined orientation, the program causes the processor not to identify the first optional object.

9. The recording medium according to claim 1, wherein:
the program causes the processor to differentiate between:
a display mode, in the display, of another optional object that is not yet identified from among the optional objects in a second period; and
a display mode, in the display, of the another optional object before a start of the second period, the second period being a period after an optional object is identified for the first time from among the optional objects until the one or more optional objects are selected.

10. The recording medium according to claim 1, wherein:
the program causes the processor to differentiate between:
a display mode, in the display, of the first optional object after the first optional object is identified; and
a display mode, in the display, of the first optional object that is not yet identified.

11. The recording medium according to claim 4, wherein:
the program causes the processor to differentiate between:
a display mode, in the display, of at least some optional objects from among the optional objects in a period before a start of the first period; and
a display mode, in the display, of the at least some optional objects in a period of a part or entire of the first period.

12. An information processing system comprising:
a Head Mounted Display including a display; and
an information processing apparatus,
wherein the information apparatus includes:
a processor; and
a memory that is operatively coupled to the processor and is configured to store instructions executed by the processor, upon execution of the instructions the processor is configured to:
cause a display provided on a Head Mounted Display to display a stereoscopic image to which binocular parallax is applied, the stereoscopic image being an image of a virtual space in which optional objects are disposed, and the virtual space being captured by a virtual camera;
acquire orientation information on an orientation of the Head Mounted Display;
identify a first optional object based on a predetermined position relationship being established between a virtual line and a first optional object from among the optional objects, the virtual line having a direction according to the orientation information and intersecting with a virtual straight line extending along an optical axis of the virtual camera;
identify a second optional object based on a predetermined position relationship being established between the virtual line and a second optional object from among the optional objects; and
based on a predetermined condition relating to the orientation information being satisfied,
select the identified first and second optional objects.

13. An information processing method comprising:
causing a display provided on a Head Mounted Display to display a stereoscopic image to which binocular parallax is applied, the stereoscopic image being an image of a virtual space in which optional objects are disposed, and the virtual space being captured by a virtual camera;
acquiring orientation information on an orientation of the Head Mounted Display;
identify a first optional object based on a predetermined position relationship being established between a virtual line and a first optional object from among the optional objects, the virtual line having a direction according to the orientation information and intersecting with a virtual straight line extending along an optical axis of the virtual camera,
identify a second optional object based on a predetermined position relationship being established between the virtual line and a second optional object from among the optional objects; and
based on a predetermined condition relating to the orientation information being satisfied,
selecting the identified first and second optional objects.

14. The recording medium according to claim 1, wherein the virtual camera has a virtual space coordinate system and the Head Mounted Display has an apparatus coordinate system different from the virtual space coordinate system.

15. The recording medium according to claim 14, wherein the virtual space coordinate system has an original at a predetermined position in the virtual space, and the apparatus coordinate system has an original at a predetermined position of the Head Mounted Display.

16. The recording medium according to claim 14, wherein the apparatus coordinate system is fixed to the virtual space coordinate system.

17. The recording medium according to claim 1, wherein the optional objects are representative of options related to a game.

* * * * *